US012598488B2

(12) United States Patent
Khoshnevisan et al.

(10) Patent No.: US 12,598,488 B2
(45) Date of Patent: Apr. 7, 2026

(54) PHYSICAL DOWNLINK CONTROL CHANNEL REPETITION IN THE PRESENCE OF SEARCH SPACE SET SWITCHING

(71) Applicant: QUALCOMM Incorporated, San Diego, CA (US)

(72) Inventors: Mostafa Khoshnevisan, San Diego, CA (US); Jing Sun, San Diego, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 524 days.

(21) Appl. No.: 17/644,421

(22) Filed: Dec. 15, 2021

(65) Prior Publication Data

US 2022/0232406 A1     Jul. 21, 2022

Related U.S. Application Data

(60) Provisional application No. 63/138,427, filed on Jan. 16, 2021.

(51) Int. Cl.
| | |
|---|---|
| *H04W 24/08* | (2009.01) |
| *H04L 1/08* | (2006.01) |
| *H04W 72/0446* | (2023.01) |
| *H04W 72/23* | (2023.01) |

(52) U.S. Cl.
CPC .............. *H04W 24/08* (2013.01); *H04L 1/08* (2013.01); *H04W 72/0446* (2013.01); *H04W 72/23* (2023.01)

(58) Field of Classification Search
CPC . H04W 24/08; H04W 72/23; H04W 72/0446; H04W 48/16; H04L 1/08; H04L 5/0055
See application file for complete search history.

(56) References Cited

U.S. PATENT DOCUMENTS

| | | | | |
|---|---|---|---|---|
| 11,723,027 | B2 * | 8/2023 | Lee ........................ | H04L 5/0051 |
| | | | | 370/329 |
| 11,895,650 | B2 * | 2/2024 | Kim ...................... | H04L 5/0048 |
| 11,924,869 | B2 * | 3/2024 | Mu .................... | H04W 52/0216 |
| 2018/0359717 | A1 * | 12/2018 | Akkarakaran ........ | H04W 8/005 |
| 2019/0182807 | A1 * | 6/2019 | Panteleev ............. | H04L 5/0048 |

(Continued)

FOREIGN PATENT DOCUMENTS

| | | | | |
|---|---|---|---|---|
| CA | 2802039 A1 * | 12/2011 | ............ | H04W 72/23 |
| EP | 3945692 A1 | 2/2022 | | |

(Continued)

OTHER PUBLICATIONS

International Search Report and Written Opinion—PCT/US2021/072946—ISA/EPO—Apr. 26, 2022.

*Primary Examiner* — Shean Tokuta
(74) *Attorney, Agent, or Firm* — Harrity & Harrity, LLP

(57) ABSTRACT

Various aspects of the present disclosure generally relate to wireless communication. In some aspects, a user equipment (UE) may receive, from a base station, search space (SS) configuration information associated with switching between a first SS set group and a second SS set group. The UE may receive, from the base station, downlink control information associated with physical downlink control channel repetitions based at least in part on switching between the first SS set group and the second SS set group. Numerous other aspects are described.

30 Claims, 13 Drawing Sheets

(56)  References Cited

U.S. PATENT DOCUMENTS

| | | | | |
|---|---|---|---|---|
| 2020/0022144 A1 | 1/2020 | Papasakellariou | | |
| 2020/0053757 A1* | 2/2020 | Bagheri | H04L 5/0007 |
| 2020/0351682 A1* | 11/2020 | Cirik | H04W 76/28 |
| 2020/0351847 A1* | 11/2020 | Kim | H04L 5/0094 |
| 2020/0367253 A1* | 11/2020 | Kim | H04W 80/08 |
| 2020/0389874 A1* | 12/2020 | Lin | H04L 5/0053 |
| 2021/0045147 A1* | 2/2021 | Zhou | H04W 72/23 |
| 2021/0136685 A1* | 5/2021 | Sun | H04W 52/0274 |
| 2021/0144717 A1* | 5/2021 | Tsai | H04W 8/24 |
| 2021/0195601 A1* | 6/2021 | Khoshnevisan | H04W 72/53 |
| 2021/0243741 A1* | 8/2021 | Lin | H04W 76/28 |
| 2021/0360667 A1* | 11/2021 | Moon | H04L 5/0035 |
| 2022/0030565 A1* | 1/2022 | Xu | H04W 72/23 |
| 2022/0030577 A1* | 1/2022 | Zhou | H04L 5/0055 |
| 2022/0038207 A1* | 2/2022 | Frenne | H04L 5/0053 |
| 2022/0039072 A1* | 2/2022 | Babaei | H04L 5/0053 |
| 2022/0070835 A1* | 3/2022 | Khoshnevisan | H04W 52/0216 |
| 2022/0078728 A1* | 3/2022 | Yi | H04W 48/16 |
| 2022/0086867 A1* | 3/2022 | Papasakellariou | H04W 72/1263 |
| 2022/0095343 A1* | 3/2022 | Khoshnevisan | H04W 72/1273 |
| 2022/0124774 A1* | 4/2022 | Khoshnevisan | H04L 5/0055 |
| 2022/0150946 A1* | 5/2022 | Tsai | H04W 76/28 |
| 2022/0167324 A1* | 5/2022 | Baskaran | H04B 7/06968 |
| 2022/0191964 A1* | 6/2022 | Sebire | H04W 72/0446 |
| 2022/0201653 A1* | 6/2022 | Zhang | H04W 72/0446 |
| 2022/0209904 A1* | 6/2022 | Jang | H04L 1/1896 |
| 2022/0210679 A1* | 6/2022 | Cirik | H04W 24/08 |
| 2022/0217694 A1* | 7/2022 | Kim | H04L 1/1864 |
| 2022/0225133 A1* | 7/2022 | Khoshnevisan | H04L 5/0053 |
| 2022/0225291 A1* | 7/2022 | Khoshnevisan | H04W 72/23 |
| 2022/0225301 A1* | 7/2022 | Khoshnevisan | H04L 5/0094 |
| 2022/0225319 A1* | 7/2022 | Khoshnevisan | H04W 72/0453 |
| 2022/0225368 A1* | 7/2022 | Khoshnevisan | H04W 24/08 |
| 2022/0225374 A1* | 7/2022 | Wang | H04W 72/20 |
| 2022/0225378 A1* | 7/2022 | Khoshnevisan | H04L 5/0053 |
| 2022/0232401 A1* | 7/2022 | Nam | H04L 5/0053 |
| 2022/0232406 A1* | 7/2022 | Khoshnevisan | H04W 24/08 |
| 2022/0304037 A1* | 9/2022 | Zhang | H04L 1/0046 |
| 2022/0312380 A1* | 9/2022 | Chen | H04W 72/02 |
| 2022/0338178 A1* | 10/2022 | Kuang | H04W 52/0229 |
| 2022/0361022 A1* | 11/2022 | Cheng | H04W 72/23 |
| 2023/0068855 A1* | 3/2023 | Ouchi | H04W 72/23 |
| 2023/0072069 A1* | 3/2023 | Wu | H04L 5/0098 |
| 2023/0133263 A1* | 5/2023 | Jin | H04L 5/0053 |
| | | | 370/329 |

| | | | | |
|---|---|---|---|---|
| 2023/0269742 A1* | 8/2023 | Kuang | H04W 72/1263 |
| | | | 370/329 |
| 2023/0319708 A1* | 10/2023 | Ma | H04W 52/0209 |
| | | | 455/574 |
| 2023/0362952 A1* | 11/2023 | He | H04W 72/232 |
| 2023/0362956 A1* | 11/2023 | Takahashi | H04W 72/232 |
| 2023/0363005 A1* | 11/2023 | Cirik | H04W 52/50 |
| 2023/0371039 A1* | 11/2023 | Tsai | H04W 72/232 |
| 2023/0397191 A1* | 12/2023 | Bagheri | H04W 72/52 |
| 2023/0397204 A1* | 12/2023 | Yuan | H04L 1/08 |
| 2023/0397224 A1* | 12/2023 | Lai | H04W 52/0216 |
| 2024/0057108 A1* | 2/2024 | Yi | H04L 1/1854 |
| 2024/0089765 A1* | 3/2024 | Cirik | H04W 24/08 |

FOREIGN PATENT DOCUMENTS

| | | | | | |
|---|---|---|---|---|---|
| WO | WO-2013065409 A1 * | 5/2013 | | H04W 72/23 |
| WO | WO-2015050339 A1 * | 4/2015 | | H04B 7/26 |
| WO | WO-2015050359 A1 * | 4/2015 | | H04W 72/23 |
| WO | WO-2019074043 A1 * | 4/2019 | | H04J 13/16 |
| WO | WO-2019139955 A1 * | 7/2019 | | H04W 72/23 |
| WO | WO-2019144345 A1 * | 8/2019 | | H04W 4/00 |
| WO | WO-2019239814 A1 * | 12/2019 | | H04W 72/53 |
| WO | WO-2020032727 A1 * | 2/2020 | | H04W 74/0833 |
| WO | WO-2020064512 A1 * | 4/2020 | | H04L 1/0072 |
| WO | WO-2020065624 A1 * | 4/2020 | | H04L 5/0094 |
| WO | WO-2020077621 A1 * | 4/2020 | | H04W 72/23 |
| WO | WO-2020145747 A1 * | 7/2020 | | H04W 74/08 |
| WO | WO-2020166045 A1 * | 8/2020 | | H04L 27/2602 |
| WO | WO-2020173448 A1 * | 9/2020 | | H04L 5/0053 |
| WO | WO-2020243931 A1 * | 12/2020 | | H04W 72/23 |
| WO | WO-2020246858 A1 * | 12/2020 | | H04W 72/23 |
| WO | WO-2020264121 A1 * | 12/2020 | | H04W 72/23 |
| WO | WO-2021063875 A1 * | 4/2021 | | H04W 72/23 |
| WO | WO-2021065016 A1 * | 4/2021 | | H04W 72/23 |
| WO | WO-2021067703 A1 * | 4/2021 | | H04W 72/1273 |
| WO | WO-2021091966 A1 * | 5/2021 | | H04W 72/20 |
| WO | WO-2021099872 A1 * | 5/2021 | | H04W 24/08 |
| WO | WO-2021163408 A1 * | 8/2021 | | H04L 5/0053 |
| WO | WO-2021180329 A1 * | 9/2021 | | H04W 76/28 |
| WO | WO-2022076887 A1 * | 4/2022 | | H04L 5/0053 |
| WO | WO-2022143975 A1 * | 7/2022 | | H04W 72/23 |
| WO | WO-2022155008 A1 * | 7/2022 | | H04W 72/23 |
| WO | WO-2022155237 A1 * | 7/2022 | | H04L 5/0053 |
| WO | WO-2022155241 A1 * | 7/2022 | | H04L 1/1893 |
| WO | WO-2022155623 A1 * | 7/2022 | | H04L 1/08 |
| WO | WO-2022155644 A1 * | 7/2022 | | H04L 5/0053 |
| WO | WO-2022155645 A1 * | 7/2022 | | H04W 72/23 |

* cited by examiner

PDCCH repetition 1 is included in SS set x
PDCCH repetition 2 is included in SS set y
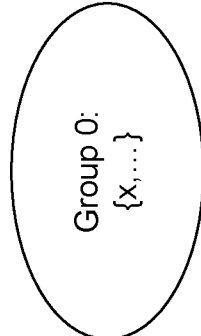
Group 0:
{x,....}
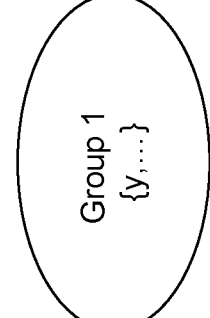
Group 1
{y,....}
FIG. 5A PDCCH repetition 1 is included in SS set x
PDCCH repetition 2 is included in SS set y
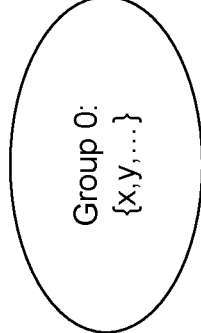
Group 0:
{x,y,...}
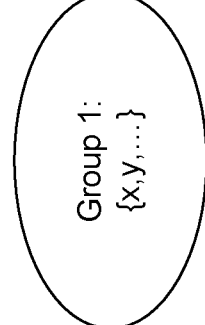
Group 1:
{x,y,...}
FIG. 5C

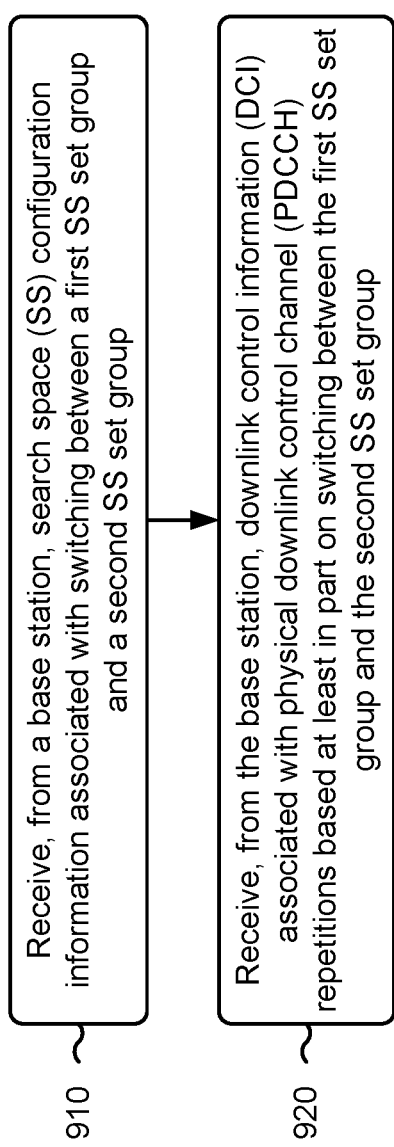

Receive, from a base station, search space (SS) configuration information associated with switching between a first SS set group and a second SS set group Receive, from the base station, downlink control information (DCI) associated with physical downlink control channel (PDCCH) repetitions based at least in part on switching between the first SS set group and the second SS set group

PHYSICAL DOWNLINK CONTROL CHANNEL REPETITION IN THE PRESENCE OF SEARCH SPACE SET SWITCHING

CROSS-REFERENCE TO RELATED APPLICATION

This patent application claims priority to U.S. Provisional Patent Application No. 63/138,427, filed on Jan. 16, 2021, entitled "PHYSICAL DOWNLINK CONTROL CHANNEL REPETITION IN THE PRESENCE OF SEARCH SPACE SET SWITCHING," and assigned to the assignee hereof. The disclosure of the prior application is considered part of and is incorporated by reference into this patent application.

FIELD OF THE DISCLOSURE

Aspects of the present disclosure generally relate to wireless communication and to techniques and apparatuses for accommodating physical downlink control channel (PDCCH) repetition in the presence of search space (SS) set switching.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" (or "forward link") refers to the communication link from the BS to the UE, and "uplink" (or "reverse link") refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a UE for wireless communication includes a memory and one or more processors coupled to the memory, the memory and the one or more processors configured to: receive, from a base station, SS configuration information associated with switching between a first SS set group and a second SS set group; and receive, from the base station, downlink control information (DCI) associated with PDCCH repetitions based at least in part on switching between the first SS set group and the second SS set group.

In some aspects, a method of wireless communication performed by a UE includes receiving, from a base station, SS configuration information associated with switching between a first SS set group and a second SS set group; and receiving, from the base station, DCI associated with PDCCH repetitions based at least in part on switching between the first SS set group and the second SS set group.

In some aspects, a non-transitory computer-readable medium storing a set of instructions for wireless communication includes one or more instructions that, when executed by one or more processors of a UE, cause the UE to: receive, from a base station, SS configuration information associated with switching between a first SS set group and a second SS set group; and receive, from the base station, DCI associated with PDCCH repetitions based at least in part on switching between the first SS set group and the second SS set group.

In some aspects, an apparatus for wireless communication includes means for receiving, from a base station, SS configuration information associated with switching between a first SS set group and a second SS set group; and means for receiving, from the base station, DCI associated with PDCCH repetitions based at least in part on switching between the first SS set group and the second SS set group.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antennas, radio frequency chains, power amplifiers, modulators, buffers, processor(s), interleavers, adders, or summers). It is intended that aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIGS. 5A-5C are diagrams illustrating examples associated with accommodating PDCCH repetition in the presence of SS set switching, in accordance with the present disclosure.

FIG. 9 is a diagram illustrating an example process associated with accommodating PDCCH repetition in the presence of SS set switching, in accordance with the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
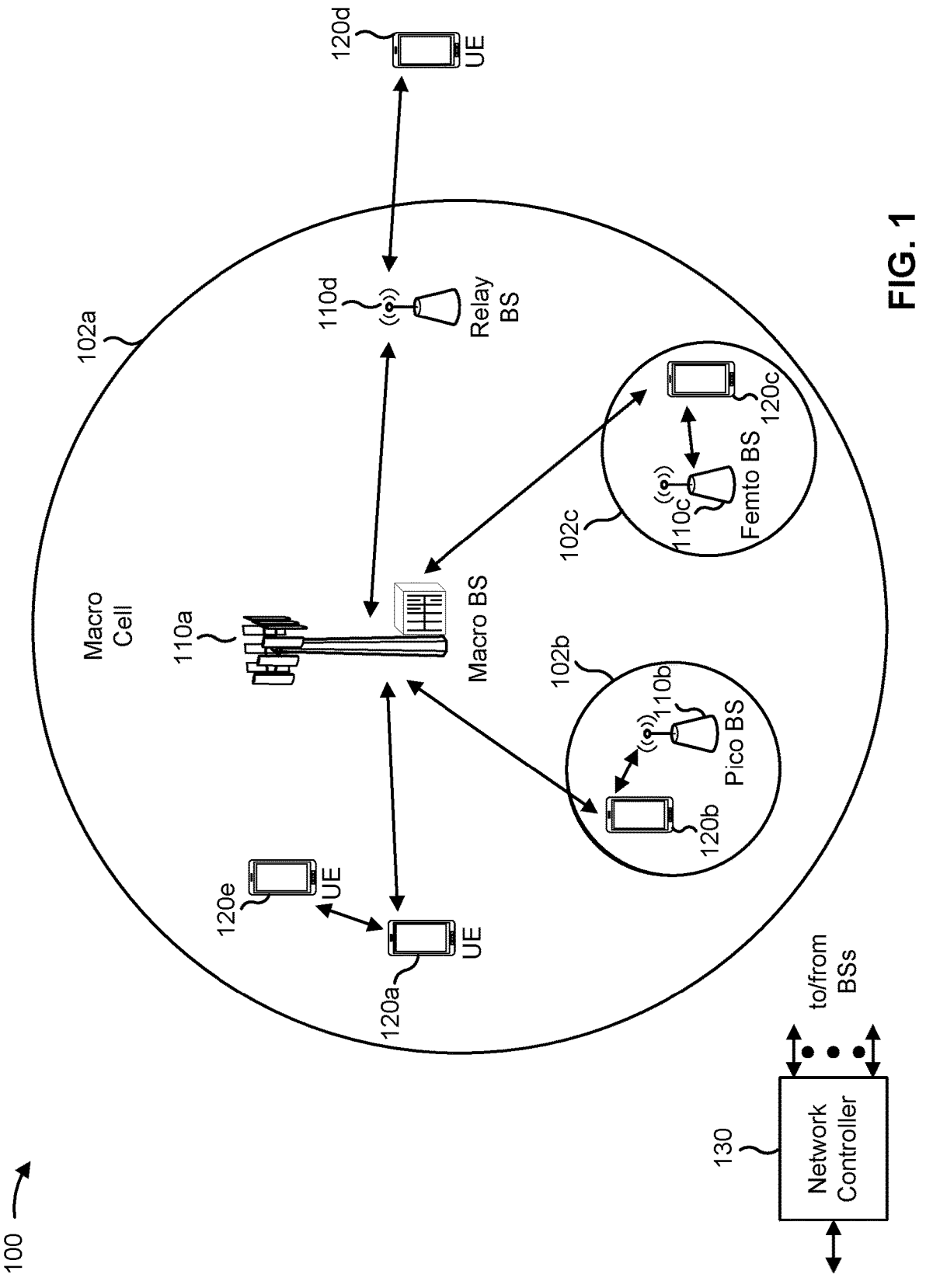
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110*a*, BS 110*b*, BS 110*c*, and BS 110*d*) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. ABS for a pico cell may be referred to as a pico BS. ABS for a femto cell may be referred to as a femto BS or a home BS. In the example shown in FIG. 1, a BS 110*a* may be a macro BS for a macro cell 102*a*, a BS 110*b* may be a pico BS for a pico cell 102*b*, and a BS 110*c* may be a femto BS for a femto cell 102*c*. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110*d* may communicate with macro BS 110*a* and a UE 120*d* in order to facilitate communication between BS 110*a* and UE 120*d*. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, directly or indirectly, via a wireless or wireline backhaul.

UEs 120 (e.g., 120*a*, 120*b*, 120*c*) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V21) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
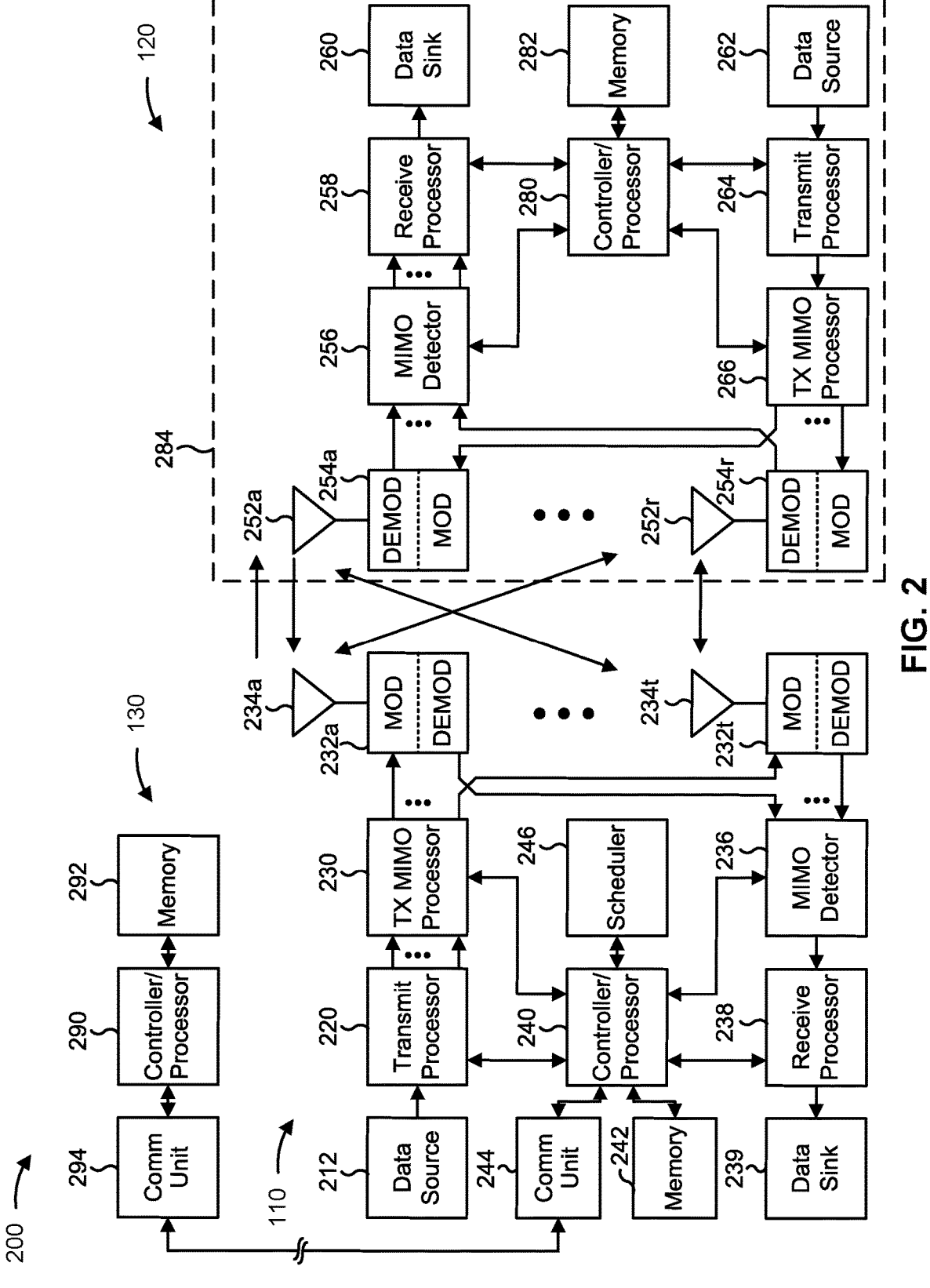
FIG. 2 is a diagram illustrating an example of a base station in communication with a UE in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a channel quality indicator (CQI) parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein (for example, as described with reference to FIGS. 3-10).

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor

US 12,598,488 B2

9

240) and memory 242 to perform aspects of any of the methods described herein (for example, as described with reference to FIGS. 3-10).

Controller/processor 240 of base station 110, controller/processor 280 of UE 120, and/or any other component(s) of FIG. 2 may perform one or more techniques associated with accommodating PDCCH repetition in the presence of SS set switching, as described in more detail elsewhere herein. For example, controller/processor 240 of base station 110, controller/processor 280 of UE 120, and/or any other component(s) of FIG. 2 may perform or direct operations of, for example, process 900 of FIG. 9 and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 900 of FIG. 9 and/or other processes as described herein. In some aspects, executing instructions may include running the instructions, converting the instructions, compiling the instructions, and/or interpreting the instructions, among other examples.

In some aspects, a UE (e.g., UE 120) includes means for receiving, from a base station, SS configuration information associated with switching between a first SS set group and a second SS set group; and/or means for receiving, from the base station, DCI associated with PDCCH repetitions based at least in part on switching between the first SS set group and the second SS set group. The means for the UE to perform operations described herein may include, for example, one or more of antenna 252, demodulator 254, MIMO detector 256, receive processor 258, transmit processor 264, TX MIMO processor 266, modulator 254, controller/processor 280, or memory 282.

In some aspects, the UE includes means for selectively monitoring the PDCCH repetitions based at least in part on switching between the first SS set group and the second SS set group.

In some aspects, the UE includes means for selectively monitoring the first PDCCH repetition or the second PDCCH repetition to receive the DCI when.

In some aspects, the UE includes means for selectively monitoring the first PDCCH repetition and the second PDCCH repetition based at least in part on the first SS set being linked to the second SS set.

In some aspects, the UE includes means for selectively monitoring the first PDCCH repetition and the second PDCCH repetition based at least in part on switching to the second SS set group.

In some aspects, the UE includes means for selectively monitoring the first PDCCH repetition and the second PDCCH repetition based at least in part on switching to the first SS set group.

In some aspects, the UE includes means for selectively monitoring the first PDCCH repetition and the second PDCCH repetition to receive the DCI.

In some aspects, the UE includes means for selectively monitoring the first PDCCH repetition and the second PDCCH repetition based at least in part on switching to the first SS set group, and/or means for selectively monitoring the first PDCCH repetition and the third PDCCH repetition based at least in part on switching to the second SS set group.

In some aspects, the UE includes means for selectively monitoring the first PDCCH repetition and the second PDCCH repetition based at least in part on switching to the first SS set group to receive the DCI.

In some aspects, the UE includes means for receiving the first PDCCH repetition during a first slot; means for receiving the second PDCCH repetition during a second slot; and/or means for selectively monitoring the second PDCCH repetition when the switching takes effect after the first PDCCH repetition is received and before the second PDCCH repetition is received.

In some aspects, the UE includes means for receiving the first PDCCH repetition during a first slot; means for receiving the second PDCCH repetition during a second slot; and/or means for refraining from monitoring the second PDCCH repetition when the switching takes effect after the first PDCCH repetition is received and before the second PDCCH repetition is received.

In some aspects, the UE includes means for receiving the first PDCCH repetition during a first slot; means for receiving the second PDCCH repetition during a second slot; and/or means for selectively monitoring the second PDCCH repetition to receive the DCI when the switching is delayed, from taking effect after the first PDCCH repetition is received and before the second PDCCH repetition is received, to taking effect after the second PDCCH repetition is received.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

A UE may conduct communications with a BS in a wireless network such as an LTE network or a 5G/NR network. The communications may include downlink communications from the BS to the UE and may include uplink communications from the UE to the BS. The downlink communications may include control information such as downlink control information (DCI), and downlink payload data.

Adequate reception of the control information by the UE and adequate reception of the uplink communications by the BS may be crucial for the data communications. This is because the UE may utilize information included in the control information to perform communication operations related to the data communications. For instance, the control information may include DCI indicating, for example, a resource block assignment and/or a modulation and coding scheme, which the UE may utilize to receive and decode the downlink payload data.

The UE may receive the DCI via a physical downlink control channel (PDCCH). The PDCCH may be received on one of one or more PDCCH candidates. The PDCCH candidates may be associated with search space (SS) sets. In an example, a PDCCH candidate with a given aggregation level and a given candidate index may be associated with a given SS set. The UE may monitor the PDCCH candidates in the SS sets and may successfully decode one or more PDCCH candidates to receive the DCI.

An SS set may be associated with one or more SS set groups, which may include a first SS set group (e.g., Group 0) and a second SS set group (e.g., Group 1). In implementations involving decentralized channel access, the first SS set group may be associated with a time before initiation of a channel occupancy time (COT). To enable frequent channel access opportunities before initiation of a COT, the UE may monitor the PDCCH candidates in the SS sets associated with the first SS set group with a first periodicity. The second SS set group may be associated with a time after initiation of a COT. The UE may monitor the PDCCH candidates in the SS sets associated with the second SS set group with a second periodicity, which may have a longer period with respect to the first periodicity. SS set group switching may be useful in implementations involving decentralized channel access, such as NR-Unlicensed, but can also be applied in other implementations.

At a given time, one of the SS set groups may be active. In other words, at a given time, the UE may monitor the PDCCH candidates in the SS sets associated with the first SS set group or the PDCCH candidates in the SS sets associated with the second SS set group. Further, the PDCCH communications between the BS and the UE may be switched from taking place in the first SS set group to taking place in the second SS set group, and vice versa. When the PDCCH communications are switched from taking place in the first SS set group to taking place in the second SS set group the UE may switch from monitoring the PDCCH candidates in the SS sets associated with the first SS set group to monitoring the PDCCH candidates in the SS sets associated with the second SS set group. Similarly, when the PDCCH communications are switched from taking place in the second SS set group to taking place in the first SS set group, the UE may switch from monitoring the PDCCH candidates in the SS sets associated with the second SS set group to monitoring the PDCCH candidates in the SS sets associated with the first SS set group.

In some cases, to enable adequate reception of the DCI, PDCCH repetition may be supported. PDCCH repetition may be associated with the BS transmitting a plurality of instances of the PDCCH candidates. For instance, the BS may transmit a PDCCH on a first PDCCH candidate (e.g., PDCCH repetition 1) and transmit the PDCCH on a second PDCCH candidate (e.g., PDCCH repetition 2). In an example, the PDCCH repetition 1 and the PDCCH repetition 2 may include substantially the same information. Two PDCCH candidates may be linked together for possible repetition of the same DCI. In some aspects, the two PDCCH candidates may have the same aggregation level (that is, the same number of control channel elements), and the DCI payload may be substantially the same. Thus, the UE can perform soft combining to decode the DCI. Soft combining involves storing multiple repetitions of the DCI and combining the multiple repetitions to determine a most likely value of the DCI. In some aspects, two PDCCH candidates in different SS sets (associated with corresponding control resource sets (CORESETs)) may be linked together for PDCCH repetition. For example, a monitoring occasion of a first SS set may be linked with a monitoring occasion of a second SS set.

The UE may not adequately receive the DCI in a case where PDCCH repetition is supported and the SS set group is switched. In an example, the active SS set group may be the first SS set group and may be associated with SS sets including PDCCH candidates, PDCCH repetition 1 and PDCCH repetition 2. In this case, the UE may monitor the PDCCH candidates, PDCCH repetition 1 and PDCCH repetition 2, to receive the DCI. During the monitoring, the UE may receive the PDCCH repetition 1. Before the UE receives the PDCCH repetition 2, the active SS set group may be switched to the second SS set group. Based on the switching of the active SS set group to the second SS set group, the UE may stop monitoring the PDCCH candidates included in the SS sets associated with the first SS set group and start monitoring the PDCCH candidates included in the SS sets associated with the second SS set group. As a result, the UE may fail to receive the PDCCH 2. Additionally, if the UE fails to successfully decode PDCCH repetition 1, the UE may not adequately receive the DCI.

Without adequately receiving the DCI, the UE may fail to perform the communication operations related to the data communications. Consequently, the data communications between the BS and the UE may experience an interruption or a stoppage.

Various aspects of techniques and apparatuses described herein may enable accommodation of PDCCH repetition in the presence of SS set switching. In some aspects, the techniques and apparatuses discussed herein may enable the UE to monitor PDCCH candidates, when PDCCH repetition is supported and an active SS set group is switched, such that the UE may adequately receive the DCI with benefits of PDCCH repetition. For example, the techniques and apparatuses described herein may enable switching between PDCCH repetition based monitoring (for linked monitoring occasions) and individual monitoring (for unlinked monitoring occasions). Based at least in part on adequately receiving the DCI, the UE may adequately perform communication operations related to the data communications. In this way, the data communications between the BS and the UE may continue uninterrupted.

Figure 3:
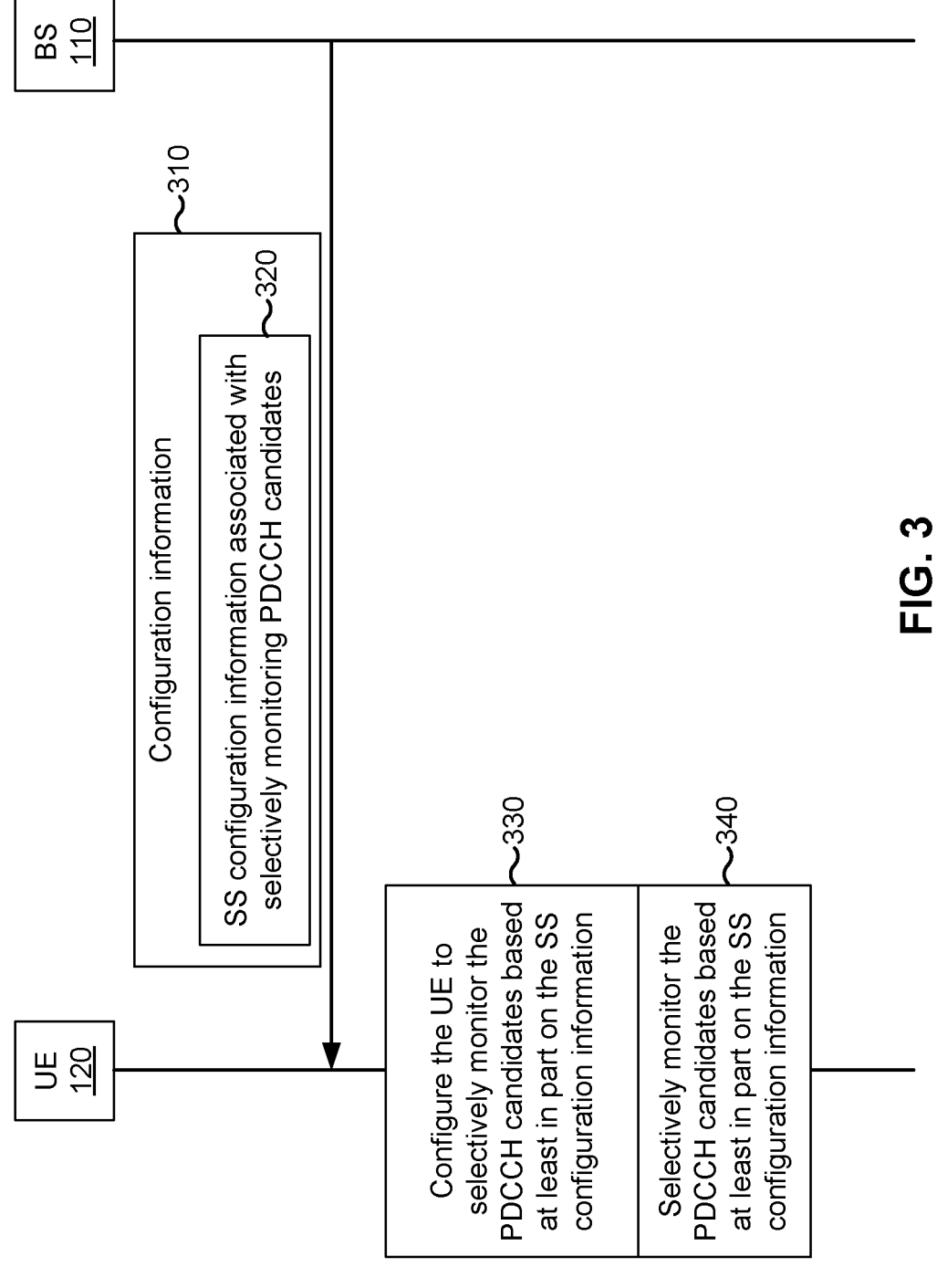
FIG. 3 is a diagram illustrating an example associated with accommodating PDCCH repetition in the presence of SS set switching, in accordance with the present disclosure.

FIGS. 3-8 are diagrams illustrating examples associated with accommodating PDCCH repetition in the presence of SS set switching, in accordance with the present disclosure. FIG. 3 shows a UE 120 and a BS 110 conducting data communications in, for example, an LTE network or a 5G/NR network. The data communications may take place over a channel and may include downlink communications from the BS 110 to the UE 120 and may include uplink communications from the UE 120 to the BS 110. The downlink communications may include DCI and downlink payload data.

As shown by reference number 310, the BS 110 may transmit, and the UE 120 may receive, configuration information prior to initiation of, at a beginning of, and/or during the data communications. In some aspects, the configuration information may include an indication of, for example, one or more configuration parameters for the UE 120 to use to configure the UE 120 for the data communications. In some aspects, the UE 120 may receive the configuration information via system information broadcasted by the BS 110. In some aspects, the UE 120 may receive the configuration information from a device other than BS 110 (e.g., from another base station). In some aspects, the UE 120 may receive the configuration information via, for example, a control channel (e.g., a PDCCH) between the UE 120 and the BS 110. The configuration information may be communicated via radio resource control (RRC) signaling, MAC signaling (e.g., MAC control element (MAC CE)), DCI signaling, or a combination thereof (e.g., RRC configuration of a set of values for a parameter and DCI indication of a selected value of the parameter).

As shown by reference number 320, the configuration information may include SS configuration information associated with the UE 120 monitoring PDCCH candidates to adequately receive the DCI. In some aspects, based at least in part on the SS configuration information, the UE 120 may be enabled to adequately receive the DCI. As shown by reference number 330, based at least in part on the SS configuration information, the UE 120 may configure the UE 120 to selectively monitor the PDCCH candidates to receive the DCI. The PDCCH candidates may be associated with SS sets. As shown by reference number 340, the UE may selectively monitor the PDCCH candidates in the SS sets and may successfully decode one or more PDCCH candidates to receive the DCI.

The SS sets may, in turn, be associated with one or more of a first SS set group (e.g., Group 0) and a second SS set group (e.g., Group 1). In some aspects, the SS configuration information may indicate an association of the SS sets with one or more of the SS set group. For instance, the SS configuration information may indicate that a first SS set (e.g., SS set x) is associated with Group 0 and/or with Group 1, that a second SS set (e.g., SS set y) is associated with Group 0 and/or with Group 1, that a third SS set (e.g., SS set z) is associated with Group 0 and/or with Group 1, and so on.

At a given time, one of the SS set groups may be an active SS set group. The SS configuration information may indicate switching information associated with switching between the SS set groups. For instance, the SS configuration information may indicate switching information associated with switching between Group 0 being the active SS set group and Group 1 being the active SS set group. In some aspects, the switching information may indicate explicit switching between the SS set groups. The explicit switching may be indicated via a field including a flag bit (e.g., a search space set group switching flag bit) transmitted in, for example, DCI format 2_0. A value of the flag bit may indicate the next active SS set group. For instance, a flag bit value of 0 may indicate a switch from Group 1 being the active SS set group to Group 0 being the active SS set group (e.g., switch from Group 1 to Group 0). Similarly, a flag bit value of 1 may indicate a switch from Group 0 being the active SS set group to Group 1 being the active SS set group (e.g., switch from Group 0 to Group 1). In some aspects, the explicit switching may be utilized to switch from Group 0 to Group 1 or from Group 1 to Group 0.

In some aspects, the switching information may indicate implicit switching between the SS set groups. In an example, the switching information may indicate switching between the SS set groups based at least in part on detection and/or reception, by the UE 120, of a DCI format via a PDCCH candidate included in an SS set associated with a currently active SS set group. For instance, the switching information may indicate a switch from, for example, Group 0 to Group 1 based at least in part on detection and/or reception of a DCI format via a PDCCH candidate included in an SS set associated with currently active Group 0. In some aspects, such implicit switching may be conditioned on non-configuration of the field including the flag bit in another DCI format such as DCI format 2_0 (e.g., when the field including the flag bit in, for example, DCI format 2_0 is not configured). In some aspects, such implicit switching may be inoperative to indicate a switch from Group 1 to Group 0.

In some aspects, implicit switching may include switching between the SS set groups based at least in part on an expiration of a timer. For instance, the SS configuration information may indicate that the UE 120 is to start the timer when Group 1 becomes the active SS set group, and that the expiration of the timer indicates a switch from Group 1 to Group 0. In some aspects, the UE may set a duration associated with the timer based at least in part on a timer field (e.g., searchSpaceSwitchingTimer) included in a received DCI. In some aspects, such timer-based implicit switching may be inoperative to indicate a switch from Group 0 to Group 1.

In some aspects, when the data communications take place over an unlicensed band, an end of COT indication may indicate a switch from Group 1 to Group 0.

Based at least in part on the switching information, the UE 120 may configure the UE 120 to monitor PDCCH candidates in the SS sets associated with the active SS set group. For instance, when the active SS set group switches from Group 0 to Group 1, the UE 120 may stop monitoring the PDCCH candidates included in the SS sets associated with Group 0 and may start monitoring the PDCCH candidates included in the SS sets associated with Group 1, and vice versa.

The switching information may also indicate a timeline associated with the switch between the SS set groups. For instance, a delay field (e.g., searchSpaceSwitchingDelay-r16) may indicate a delay duration associated with the switch between the SS set groups. Based at least in part on the delay duration, the UE 120 may delay monitoring PDCCH candidates included in the SS sets associated with the next active SS set group. In some aspects, the delay duration may be related to a duration associated with a predetermined number of symbols (e.g., $P_{switch}$). Further, the switching information may indicate that the UE 120 is to start monitoring the PDCCH candidates included in the SS sets associated with the next active SS set group at a beginning of a first slot that begins at least $P_{switch}$ number of symbols after the indication to switch.

Figure 4A:
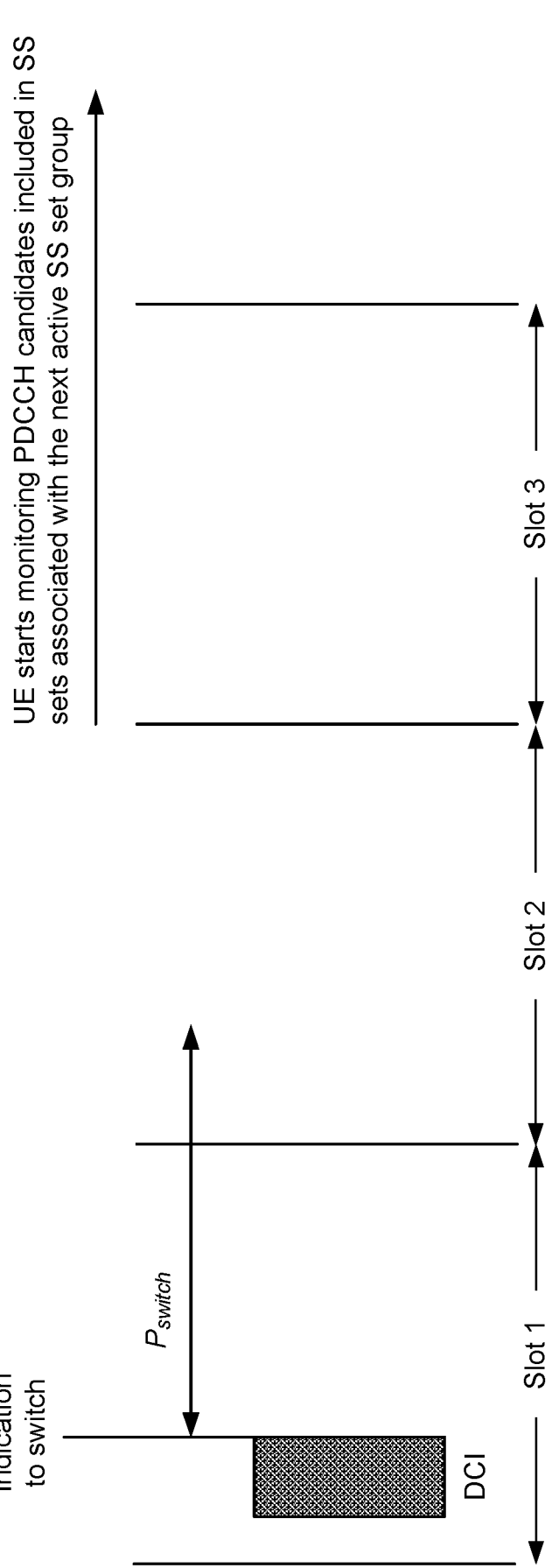
FIGS. 4A-4B are diagrams illustrating examples associated with accommodating PDCCH repetition in the presence of SS set switching, in accordance with the present disclosure.

For instance, as shown in the example of FIG. 4A, when the switching information indicates explicit and/or implicit switching via a DCI received during Slot 1, the UE 120 may configure the UE 120 to determine the delay duration by counting the $P_{switch}$ number of symbols after receiving the DCI. In some aspects, an end of the delay duration may be during another slot, Slot 2. The UE 120 may start monitoring the PDCCH candidates included in SS sets associated with the next active SS set group at a start of the first slot, Slot 3, that begins after at least $P_{switch}$ number of symbols after the indication to switch.

Figure 4B:
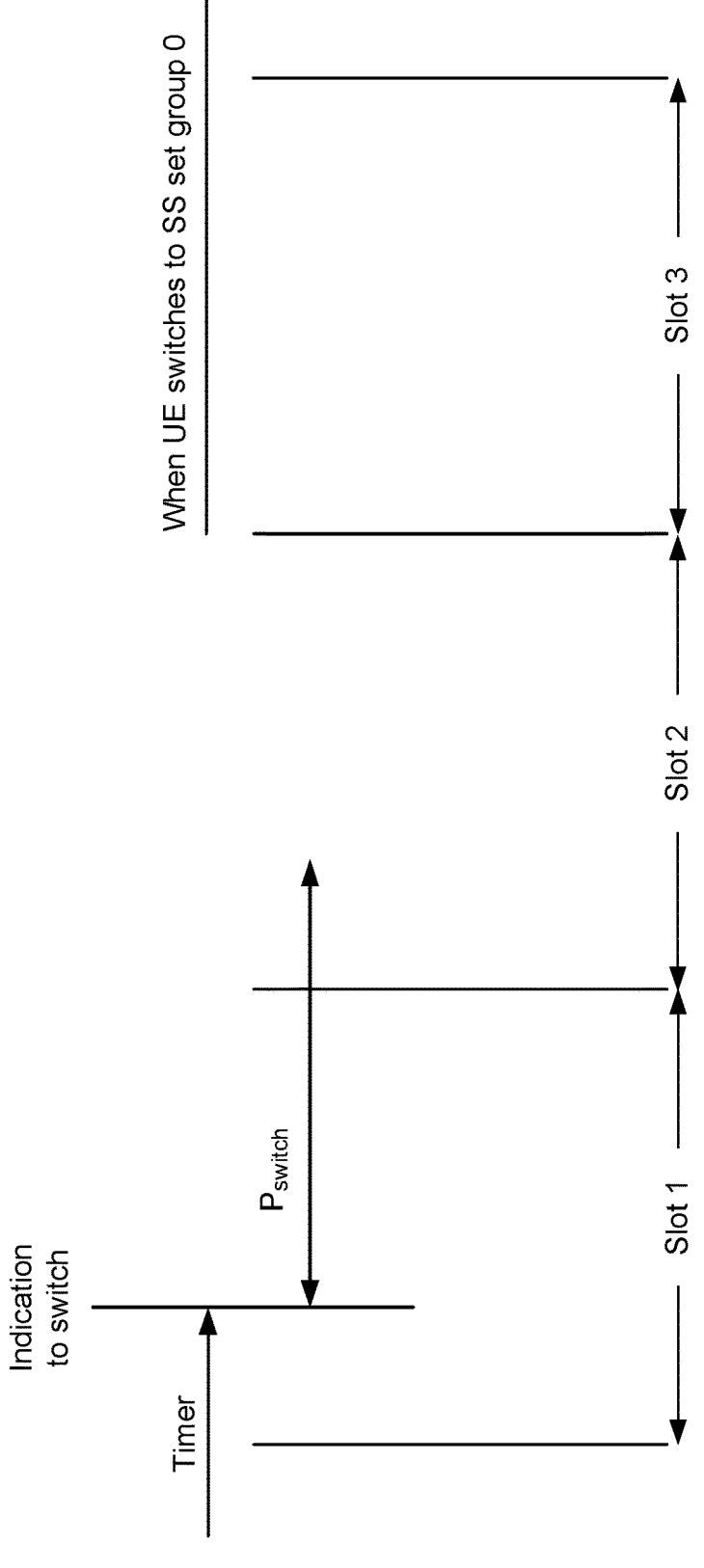

Similarly, as shown in the example of FIG. 4B, when the switching information indicates switching based at least in part on an expiration of the timer during Slot 1, the UE 120 may configure the UE 120 to determine the delay duration by counting the $P_{switch}$ number of symbols after the expiration. In some aspects, the end of the delay duration may be during another slot, Slot 2. The UE 120 may start monitoring the PDCCH candidates included in SS sets associated with the next active SS set group at a start of a first slot, Slot 3, that begins after at least $P_{switch}$ number of symbols after the indication to switch.

In some aspects, the SS configuration information may indicate that PDCCH repetition is supported. PDCCH repetition may be associated with the BS 110 transmitting a plurality of instances of the PDCCH candidates. For instance, the BS 110 may transmit a first PDCCH candidate (e.g., PDCCH repetition 1) and transmit a second PDCCH candidate (e.g., PDCCH repetition 2). In an example, the PDCCH repetition 1 and the PDCCH repetition 2 may be linked together to repeat transmission of substantially the same information (e.g., the same DCI). The linkage between the first PDCCH candidate/repetition and the second PDCCH candidate/repetition may also be referred to as and/or may be analogous to a linkage between the first SS set, including the first PDCCH candidate/repetition, and the second SS set, including the second PDCCH candidate/repetition. In some aspects, the PDCCH repetition 1 and the PDCCH repetition 2 may be linked together by having, for example, a same aggregation level associated with having a same quantity of control channel elements (CCEs). In the present disclosure, "PDCCH candidates" may refer to "PDCCH repetitions" and vice versa.

In some aspects, the SS configuration information may indicate that the PDCCH repetitions may be associated with different SS sets. For instance, the SS configuration information may indicate that the PDCCH repetition 1 is included in, for example, SS set x and that the PDCCH repetition 2 is included in, for example, SS set y. In this case, the UE 120 may determine that a monitoring occasion associated with monitoring the PDCCH repetition 1 is linked to a monitoring occasion associated with monitoring the PDCCH repetition 2. In some aspects, the SS configuration information may indicate that the PDCCH repetition 1 and linked PDCCH repetition 2 are to be received during the same slot (e.g., intra-slot repetition). In some aspects, the SS configuration information may indicate that the PDCCH repetition 1 and linked PDCCH repetition 2 are to be received during different slots (e.g., inter-slot repetition).

In some aspects, the SS configuration information may indicate information associated with the PDCCH repetition 1 and the PDCCH repetition 2 to enable the UE 120 to determine that the PDCCH repetition 1 is linked to the PDCCH repetition 2. In an example, the SS configuration information may indicate that PDCCH candidates, included in different SS sets, may be linked together for PDCCH repetition by being configured with, for example, the same candidate index. In another example, the SS configuration may indicate that PDCCH candidates may be linked together by being configured with having, for example, the same starting CCE index.

As shown by reference number 340 of FIG. 3, the UE 120 may selectively monitor the PDCCH candidates, to receive the DCI, based at least in part on the SS configuration information. In some aspects, as shown in the example of FIG. 5A, the SS configuration information may indicate that PDCCH repetitions include a first PDCCH repetition (e.g., the PDCCH repetition 1), included in a first SS set (e.g., SS set x) associated with a first SS set group (e.g., Group 0), linked to a second PDCCH repetition (e.g., the PDCCH repetition 2), included in a second SS set (e.g., SS set y) associated with a second SS set group (e.g., Group 1).

In some aspects, the UE 120 may consider such configuration of the PDCCH repetitions (e.g., PDCCH repetition 1 being associated with Group 0 and PDCCH repetition 2 being associated with Group 1) as an error, based at least in part on determining that the UE 120 may selectively monitor the PDCCH repetitions associated with a single SS set group, which is currently active.

In some aspects, based at least in part on the SS configuration information indicating such configuration of the PDCCH repetitions, the UE 120 may selectively monitor the first PDCCH repetition or the second PDCCH repetition to receive the DCI. In an example, when the first SS set group is active, the UE 120 may monitor the first PDCCH repetition, and when the second SS set group is active, the UE 120 may monitor the second PDCCH repetition.

In some aspects, based at least in part on the SS configuration information indicating such configuration of the PDCCH repetitions, the UE 120 may determine that the UE 120 is to selectively monitor the PDCCH repetitions by ignoring a linkage between the first PDCCH repetition and the second PDCCH repetition. In this case, when the first SS set group is active, the UE 120 may individually monitor the first PDCCH repetition, and when the second SS set group is active, the UE 120 may individually monitor the second PDCCH repetition. The linkage between the first PDCCH repetition and the second PDCCH repetition may also be referred to as a linkage between the first SS set, including the first PDCCH repetition, and the second SS set, including the second PDCCH repetition.

In some aspects, based at least in part on the SS configuration information indicating such configuration of the PDCCH repetitions, the UE 120 may determine that the UE 120 is to selectively monitor the PDCCH repetitions by deciding that the second PDCCH repetition is also associated with the first SS set group and/or that the first PDCCH repetition is also associated with the second SS set group. In an example, based at least in part on the first PDCCH repetition being linked to the second PDCCH repetition, the UE 120 may decide that the second PDCCH repetition is also associated with the first SS set group and/or that the first PDCCH repetition is also associated with the second SS set group. In this case, the UE 120 may selectively monitor the first PDCCH repetition and the second PDCCH repetition to receive the DCI. In some aspects, the linkage between the first PDCCH repetition and the second PDCCH repetition may also be referred to as a linkage between the first SS set, including the first PDCCH repetition, and the second SS set, including the second PDCCH repetition.

In some aspects, the SS configuration information may indicate that a first SS set and a second SS set may be associated with a first SS set group while at least one of the first SS set or the second SS set may not be associated with the second SS set group. In an example, as shown in Example 1 of FIG. 5B, the SS configuration information may indicate that the PDCCH repetitions may include a first PDCCH repetition (e.g., PDCCH repetition 2), included in a first SS set (e.g., SS set y) associated with a first SS set group (e.g., Group 0) and with a second SS set group (e.g., Group 1), linked to a second PDCCH repetition (e.g., PDCCH repetition 1), included in a second SS set (e.g., SS set x) associated with the first SS set group (e.g., Group 0). Based at least in part on the SS configuration information indicating such a configuration, the UE 120 may selectively monitor the first PDCCH repetition and the second PDCCH repetition based at least in part on switching to the first SS set group (e.g., Group 0) as being the active SS set group. In other words, the UE 120 may monitor the first PDCCH repetition and the second PDCCH repetition when Group 0 becomes the active SS set group to receive the DCI with benefits of PDCCH repetition.

Figure 5B:
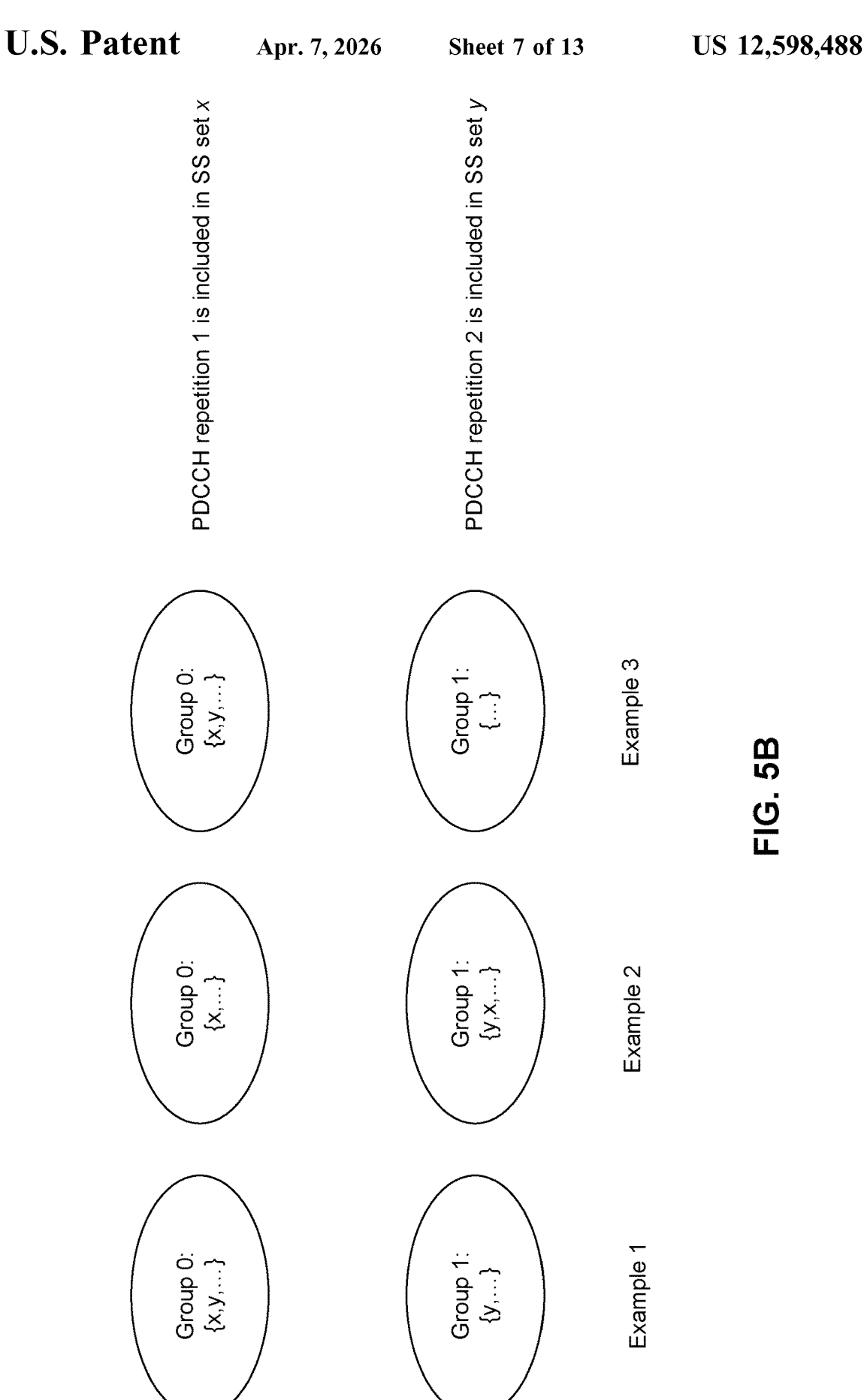

In another example, as shown in Example 2 of FIG. 5B, the SS configuration information may indicate that the PDCCH repetitions may include a first PDCCH repetition (e.g., PDCCH repetition 1), included in a first SS set (e.g., SS set x) associated with a first SS set group (e.g., Group 0) and with a second SS set group (e.g., Group 1), linked to a second PDCCH repetition (e.g., PDCCH repetition 2), included in a second SS set (e.g., SS set y) associated with the second SS set group (e.g., Group 1). Based at least in part on the SS configuration information indicating such a configuration, the UE 120 may selectively monitor the first PDCCH repetition and the second PDCCH repetition based at least in part on switching to the second SS set group (e.g., Group 1) as being the active SS set group. In other words, the UE 120 may monitor the first PDCCH repetition and the second PDCCH repetition when Group 1 becomes the active SS set group to receive the DCI with benefits of PDCCH repetition.

As shown in Example 3 of FIG. 5B, the SS configuration information may indicate that the PDCCH repetitions include a first PDCCH repetition (e.g., PDCCH repetition 1), included in a first SS set (e.g., SS set x) associated with a first SS set group (e.g., Group 0), linked to a second PDCCH repetition (e.g., PDCCH repetition 2), included in a second SS set (e.g., SS set y) associated with the first SS set group (e.g., Group 0). In this case, neither SS set x nor SS set y may be associated with Group 1. Based at least in part on the SS configuration information indicating such a configuration, the UE 120 may selectively monitor the first PDCCH repetition and the second PDCCH repetition based at least in part on switching to the first SS set group (e.g., Group 0) as being the active SS set group. In other words, the UE 120 may monitor the first PDCCH repetition and the second PDCCH repetition when Group 0 becomes the active SS set group to receive the DCI with benefits of PDCCH repetition.

In some aspects, the configurations discussed with respect to FIG. 5B may enable dynamic indication of PDCCH repetition. For instance, by dynamically switching (e.g., via DCI) between the first SS set group and the second SS set group, the BS 110 may dynamically enable and/or disable PDCCH repetition. As discussed above with respect to Example 1 and Example 2 of FIG. 5B, the UE 120 may selectively monitor the PDCCH repetitions associated with the first SS set and the second SS set when both the first SS set and the second SS set are associated with a given SS set group that is active. In this case, PDCCH repetition may be enabled or supported. When the configuration information indicates to switch to another SS set group that is associated with one of the first SS set and the second SS set, the UE 120 may selectively monitor the PDCCH candidate included in the SS set associated with the other SS set group. In this case, PDCCH repetition may not be enabled or supported.

In some aspects, the SS configuration information may indicate that each of a plurality of SS sets, including the PDCCH repetitions, is associated with a plurality of SS search set groups. For instance, as shown in the example of FIG. 5C, the SS configuration information may indicate that the PDCCH repetitions include a first PDCCH repetition (e.g., PDCCH repetition 1), included in a first SS set (e.g., SS set x) associated with a first SS set group (e.g., Group 0) and with a second SS set group (e.g., Group 1), linked to a second PDCCH repetition (e.g., PDCCH repetition 2), included in a second SS set (e.g., SS set y) associated with the first SS set group (e.g., Group 0) and with the second SS set group (e.g., Group 1). In this case, because the PDCCH repetitions are associated with both SS set groups, the UE 120 may select to monitor the first PDCCH repetition and the second PDCCH repetition regardless of which SS set group is active.

Figure 6:
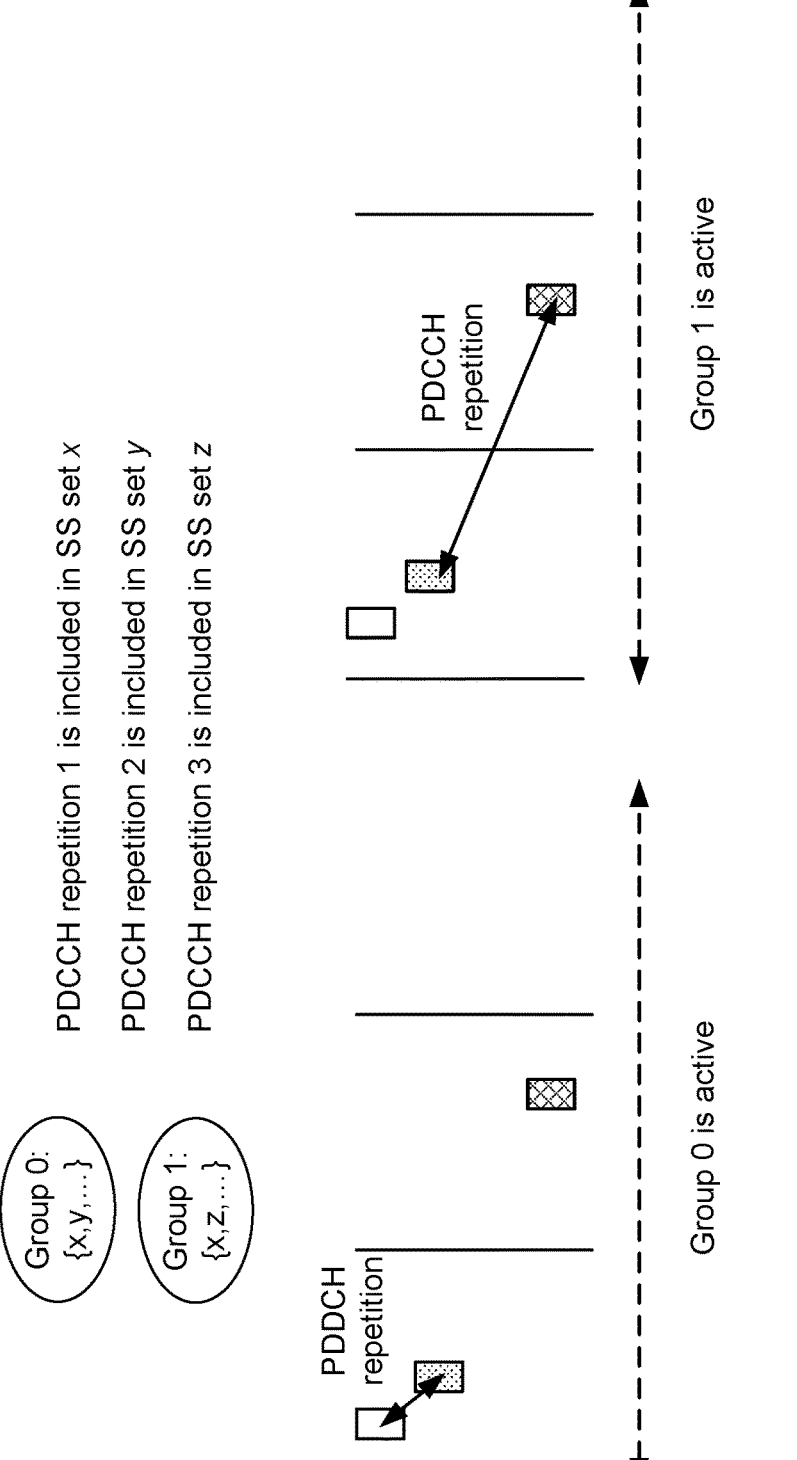
FIG. 6 is a diagram illustrating an example associated with accommodating PDCCH repetition in the presence of SS set switching, in accordance with the present disclosure.

In some aspects, as shown in FIG. 6, the SS configuration information may indicate that the PDCCH repetitions include a first PDCCH repetition (e.g., PDCCH repetition 1), included in a first SS set (e.g., SS set x) associated with a first SS set group (e.g., Group 0) and with a second SS set group (e.g., Group 1), linked to a second PDCCH repetition (e.g., PDCCH repetition 2), included in a second SS set (e.g., SS set y) associated with the first SS set group (e.g., Group 0), the first PDCCH repetition (e.g., PDCCH repetition 1) being linked to a third PDCCH repetition (e.g., PDCCH repetition 3), included in a third SS set (e.g., SS set z) associated with the second SS set group (e.g., Group 1). In some aspects, the first PDCCH repetition may be linked to the second PDCCH repetition for reception of a first DCI, and the first PDCCH repetition may be linked to the third PDCCH repetition for reception of a second DCI, which may be different with respect to the first DCI. Based at least in part on the SS configuration indicating such a configuration, the UE 120 may selectively monitor the first PDCCH repetition and the second PDCCH repetition based at least in part on switching to the first SS set group. In other words, the UE 120 may monitor the first PDCCH repetition and the second PDCCH repetition when Group 0 is active. Additionally, the UE 120 may selectively monitor the first PDCCH repetition and the third PDCCH repetition based at least in part on switching to the second SS set group. In other words, the UE 120 may monitor the first PDCCH repetition and the third PDCCH repetition when Group 1 is active.

In some aspects, the configuration discussed with respect to FIG. 6 may enable dynamic indication of PDCCH repetition. For instance, by dynamically switching (e.g., via DCI) between the first SS set group and the second SS set group, the BS 110 may dynamically enable and/or disable PDCCH repetition. Also, as shown in FIG. 6, the UE 120 may receive PDCCH repetition 1 included in SS set x and PDCCH repetition 2 included in SS set y during a given slot, indicating intra-slot PDCCH repetition. Further, as shown in FIG. 6, the UE 120 may receive PDCCH repetition 1 included in SS set x and PDCCH repetition 3 included in SS set z during different slots, indicating intra-slot PDCCH repetition. In this case, by switching between the SS set groups, the BS 110 may indicate a dynamic switch between intra-slot PDCCH repetition and inter-slot PDCCH repetition.

Figure 7:
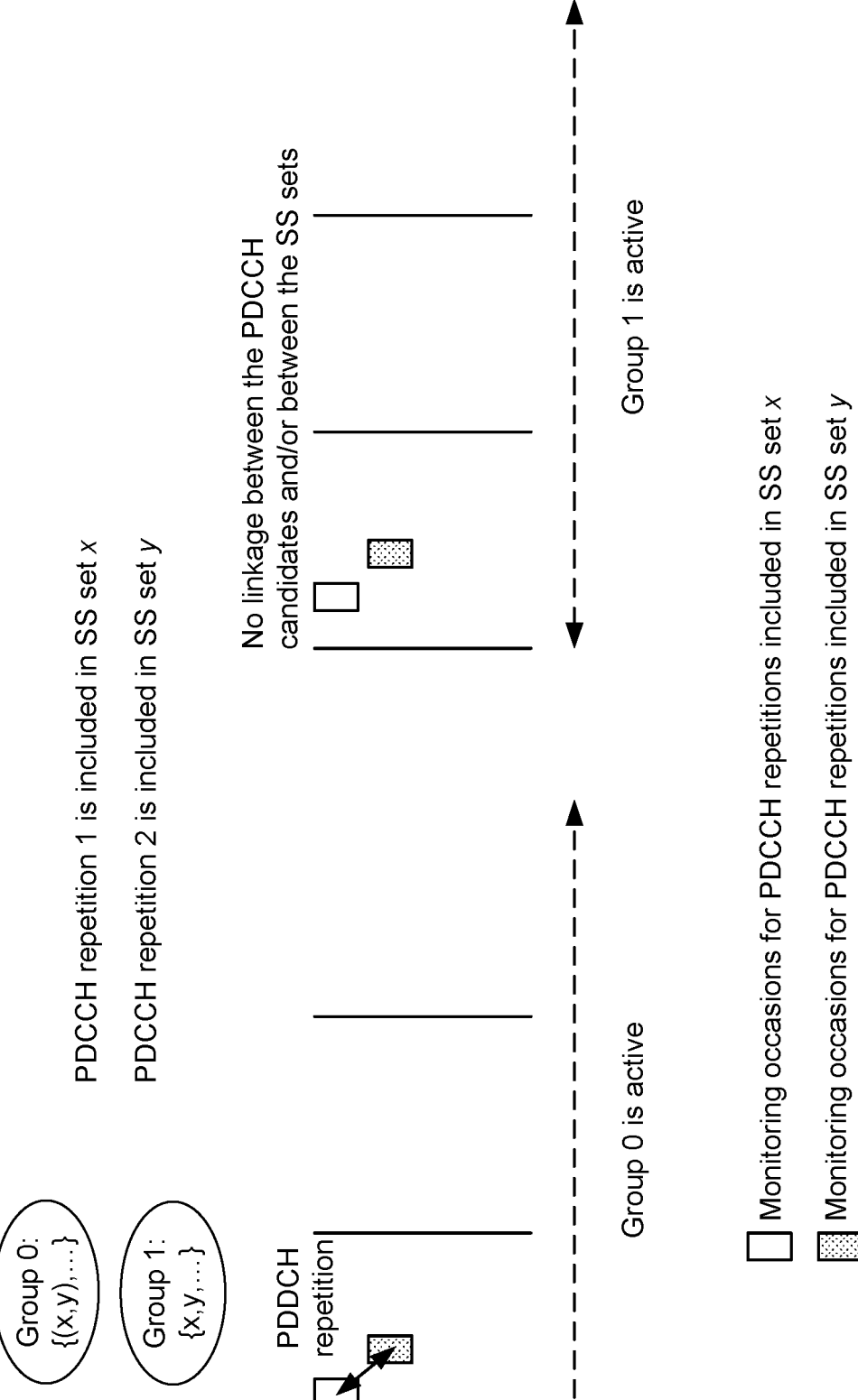
FIG. 7 is a diagram illustrating an example associated with accommodating PDCCH repetition in the presence of SS set switching, in accordance with the present disclosure.

In some aspects, as shown in FIG. 7, the SS configuration information may indicate that the PDCCH repetitions include a first PDCCH repetition (e.g., PDCCH repetition 1), included in a first SS set (e.g., SS set x), linked to a second PDCCH repetition (e.g., PDCCH repetition 2), included in a second SS set (e.g., SS set y), the first SS set (e.g., SS set x) and the second SS set (e.g., SS set y) being associated as a pair with the first SS set group (e.g., Group 0). Based at least in part on the SS configuration information indicating such a configuration, the UE 120 may selectively monitor the first PDCCH repetition and the second PDCCH repetition based at least in part on switching to the first SS set group. In this case, the first SS set and the second SS set may be associated with a given SS set group as a pair, and based at least in part on the first SS set and the second SS set being associated with the given SS set group as a pair, the UE 120 may selectively monitor the first PDCCH repetition and the second PDCCH repetition to receive the DCI. In other words, the UE 120 may monitor the first PDCCH repetition and the second PDCCH repetition when Group 0 is active to receive the DCI with benefits of PDCCH repetition.

In a situation where the first PDCCH repetition (or the first SS set) is not linked to the second PDCCH repetition (or the second SS set) and/or where the first SS set and the second SS set are not associated with a given SS set group (e.g., Group 1) as a pair, the UE 120 may select to individually monitor the PDCCH candidate included in the first SS set and the PDCCH candidate included in second SS set to receive the DCI without the assumption of PDCCH repetition.

Figure 8:
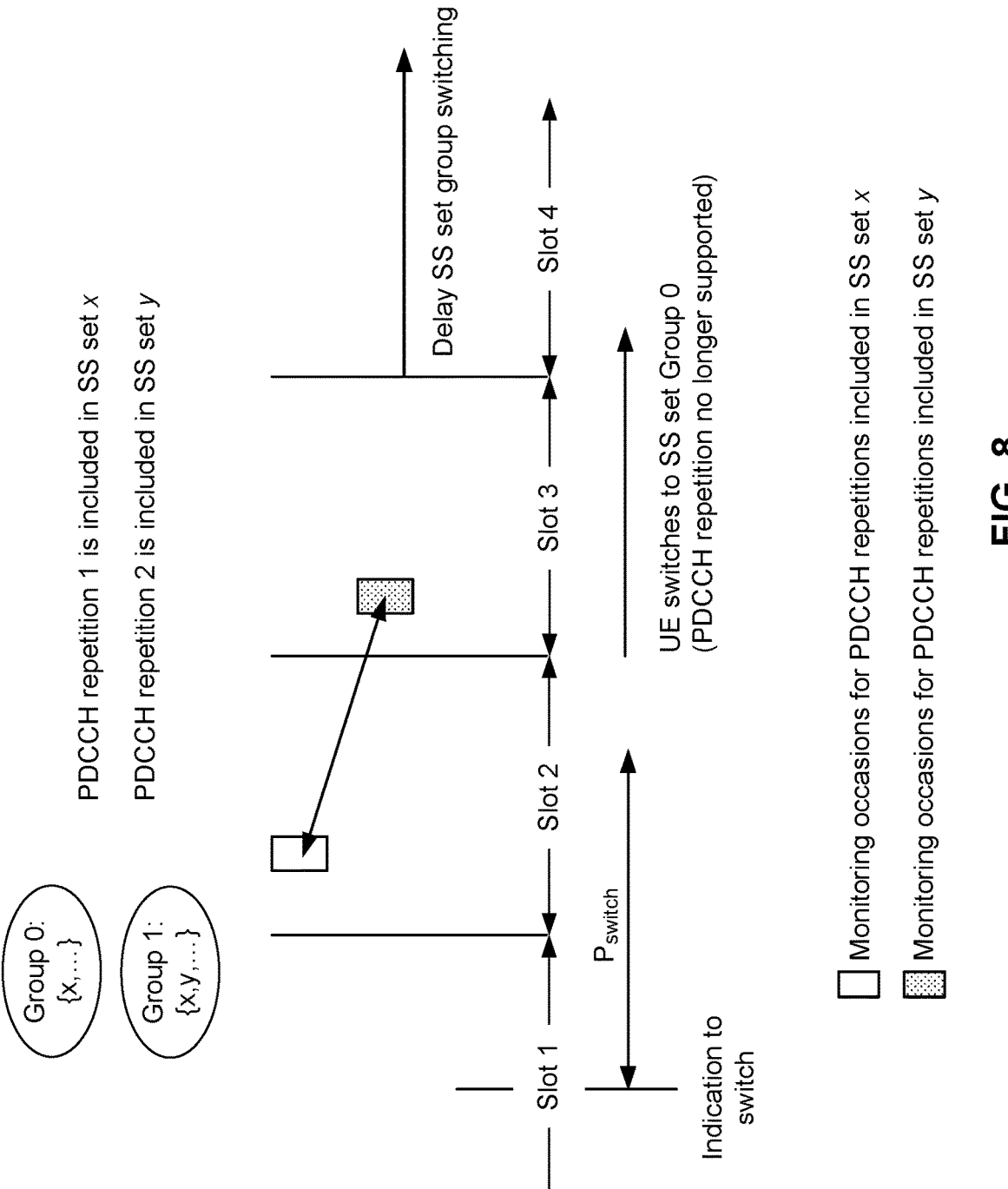
FIG. 8 is a diagram illustrating an example associated with accommodating PDCCH repetition in the presence of SS set switching, in accordance with the present disclosure.

In some aspects, as shown in FIG. 8, the SS configuration information may indicate that the PDCCH repetitions include a first PDCCH repetition (e.g., PDCCH repetition 1), included in a first SS set (e.g., SS set x), linked to a second PDCCH repetition (e.g., PDCCH repetition 2), included in a second SS set (e.g., as a set y). Further, the configuration information may indicate that the first SS set may be associated with the first SS set group (e.g., Group 0) and with the second SS set group (e.g., Group 1), and that the second SS set may be associated with the second SS set group (e.g., Group 1). The UE 120 may receive the first PDCCH repetition during a first slot (e.g., Slot 2) and may receive the second PDCCH repetition during a different slot (e.g., Slot 3), indicating inter-slot PDCCH repetition. Further, during Slot 1, switching information included in the SS configuration information may indicate a switch from Group 1 to Group 0 such that the switch takes effect (e.g., end of delay duration by counting $P_{switch}$ number of symbols occurs) after receiving the first PDCCH repetition and before receiving the second PDCCH repetition.

In an example, based at least in part on the configuration information indicating such a configuration, the UE 120 may determine that PDCCH repetition is no longer supported. Further, based at least in part on Group 0 becoming the active group, the UE 120 may select to monitor the second PDCCH repetition to receive the DCI without the benefits of PDCCH repetition. In this case, the UE 120 may also monitor other PDCCH candidates included in SS sets associated with Group 0 to receive the DCI.

In another example, based at least in part on the configuration information indicating such a configuration, the UE 120 may determine that PDCCH repetition is no longer supported and may select to refrain from monitoring the second PDCCH repetition. In this case, refraining from monitoring the second PDCCH repetition may enable the BS 110 and the UE 120 to avoid falsely relying on the UE 120 receiving the DCI with benefits of PDCCH repetition.

In yet another example, based at least in part on the configuration information indicating such a configuration, the BS 110 may transmit, and the UE 120 may receive, an indication to delay the switch from Group 1 to Group 0 until after the second PDCCH repetition is received (e.g., until a start of Slot 4). In this case, the UE 120 may select to monitor the second PDCCH repetition to receive the DCI with benefits of PDCCH repetition.

By utilizing the aspects of techniques and apparatuses described herein, the UE may be enabled to monitor PDCCH candidates, when PDCCH repetition is supported and an active SS set group is switched, such that the UE may adequately receive the DCI with benefits of PDCCH repetition. Based at least in part on adequately receiving the DCI, the UE may adequately perform communication operations related to the data communications. In this way, the data communications between the BS and the UE may continue uninterrupted.

As indicated above, FIGS. 3-8 are provided as examples. Other examples may differ from what is described with regard to FIGS. 3-8.

FIG. 9 is a diagram illustrating an example process 900 performed, for example, by a UE (e.g., UE 120), in accordance with the present disclosure. Example process 900 is an example where the UE performs operations associated with accommodating PDCCH repetition in the presence of SS set switching.

As shown in FIG. 9, in some aspects, process 900 may include receiving, from a base station, SS configuration information associated with switching between a first SS set group and a second SS set group (block 910). For example, the UE (e.g., using reception component 1002 (e.g., antenna 252, DEMOD 254, MIMO detector 256, receive processor

258, controller/processor 280, and/or the like) depicted in FIG. 9) may receive, from a base station, SS configuration information associated with switching between a first SS set group and a second SS set group, as described above.

As further shown in FIG. 9, in some aspects, process 900 may include receiving, from the base station, DCI associated with PDCCH repetitions based at least in part on switching between the first SS set group and the second SS set group (block 920). For example, the UE (e.g., using reception component 1002 (e.g., antenna 252, DEMOD 254, MIMO detector 256, receive processor 258, controller/processor 280, and/or the like) depicted in FIG. 9) may receive, from the base station, DCI associated with PDCCH repetitions based at least in part on switching between the first SS set group and the second SS set group, as described above.

Process 900 may include additional aspects, such as any single aspect or any combination of aspects described below and/or in connection with one or more other processes described elsewhere herein.

In a first aspect, process 900 includes selectively monitoring the PDCCH repetitions based at least in part on switching between the first SS set group and the second SS set group.

In a second aspect, alone or in combination with the first aspect, process 900 includes, when the PDCCH repetitions include a first PDCCH repetition, included in a first SS set associated with the first SS set group, linked to a second PDCCH repetition, included in a second SS set associated with the second SS set group, selectively monitoring the first PDCCH repetition or the second PDCCH repetition to receive the DCI.

In a third aspect, alone or in combination with the first aspect, process 900 includes, when the PDCCH repetitions include a first PDCCH repetition, included in a first SS set associated with the first SS set group, linked to a second PDCCH repetition, included in a second SS set associated with the second SS set group, selectively monitoring the first PDCCH repetition and the second PDCCH repetition based at least in part on the first SS set being linked to the second SS set.

In a fourth aspect, alone or in combination with the first aspect, process 900 includes, when the PDCCH repetitions include a first PDCCH repetition, included in a first SS set associated with the first SS set group and with the second SS set group, linked to a second PDCCH repetition, included in a second SS set associated with the second SS set group, selectively monitoring the first PDCCH repetition and the second PDCCH repetition based at least in part on switching to the second SS set group.

In a fifth aspect, alone or in combination with the first aspect, process 900 includes, when the PDCCH repetitions include a first PDCCH repetition, included in a first SS set associated with the first SS set group, linked to a second PDCCH repetition, included in a second SS set associated with the first SS set group, selectively monitoring the first PDCCH repetition and the second PDCCH repetition based at least in part on switching to the first SS set group.

In a sixth aspect, alone or in combination with the first aspect, process 900 includes, when the PDCCH repetitions include a first PDCCH repetition, included in a first SS set associated with the first SS set group and with the second SS set group, linked to a second PDCCH repetition, included in a second SS set associated with the first SS set group and with the second SS set group, selectively monitoring the first PDCCH repetition and the second PDCCH repetition to receive the DCI.

In a seventh aspect, alone or in combination with the first aspect, process 900 includes, when the PDCCH repetitions include a first PDCCH repetition, included in a first SS set associated with the first SS set group and with the second SS set group, linked to a second PDCCH repetition, included in a second SS set associated with the first SS set group, the first PDCCH repetition being linked to a third PDCCH repetition, selectively monitoring the first PDCCH repetition and the second PDCCH repetition based at least in part on switching to the first SS set group, and selectively monitoring the first PDCCH repetition and the third PDCCH repetition based at least in part on switching to the second SS set group.

In an eighth aspect, alone or in combination with the first aspect, process 900 includes, when the PDCCH repetitions include a first PDCCH repetition, included in a first SS set, linked to a second PDCCH repetition, included in a second SS set, the first SS set and the second SS set being associated as a pair with the first SS set group, selectively monitoring the first PDCCH repetition and the second PDCCH repetition based at least in part on switching to the first SS set group to receive the DCI.

In a ninth aspect, alone or in combination with the first aspect, process 900 includes, when the PDCCH repetitions include a first PDCCH repetition, included in a first SS set, linked to a second PDCCH repetition, included in a second SS set, receiving the first PDCCH repetition during a first slot, receiving the second PDCCH repetition during a second slot, and selectively monitoring the second PDCCH repetition when the switching takes effect after the first PDCCH repetition is received and before the second PDCCH repetition is received.

In a tenth aspect, alone or in combination with the first aspect, process 900 includes, when the PDCCH repetitions include a first SS set, linked to a second PDCCH repetition, included in a second SS set, receiving the first PDCCH repetition during a first slot, receiving the second PDCCH repetition during a second slot, and refraining from monitoring the second PDCCH repetition when the switching takes effect after the first PDCCH repetition is received and before the second PDCCH repetition is received.

In an eleventh aspect, alone or in combination with the first aspect, process 900 includes, when the PDCCH repetitions include a first SS set, linked to a second PDCCH repetition, included in a second SS set, receiving the first PDCCH repetition during a first slot, receiving the second PDCCH repetition during a second slot, and selectively monitoring the second PDCCH repetition to receive the DCI when the switching is delayed, from taking effect after the first PDCCH repetition is received and before the second PDCCH repetition is received, to taking effect after the second PDCCH repetition is received.

In a twelfth aspect, alone or in combination with one or more of the first through eleventh aspects, the DCI is first DCI, and process 900 further comprises receiving, prior to receiving the first DCI, second DCI indicating to switch between the first SS set group and the second SS set group, wherein receiving the first DCI associated with the PDCCH repetitions is based at least in part on the second DCI Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
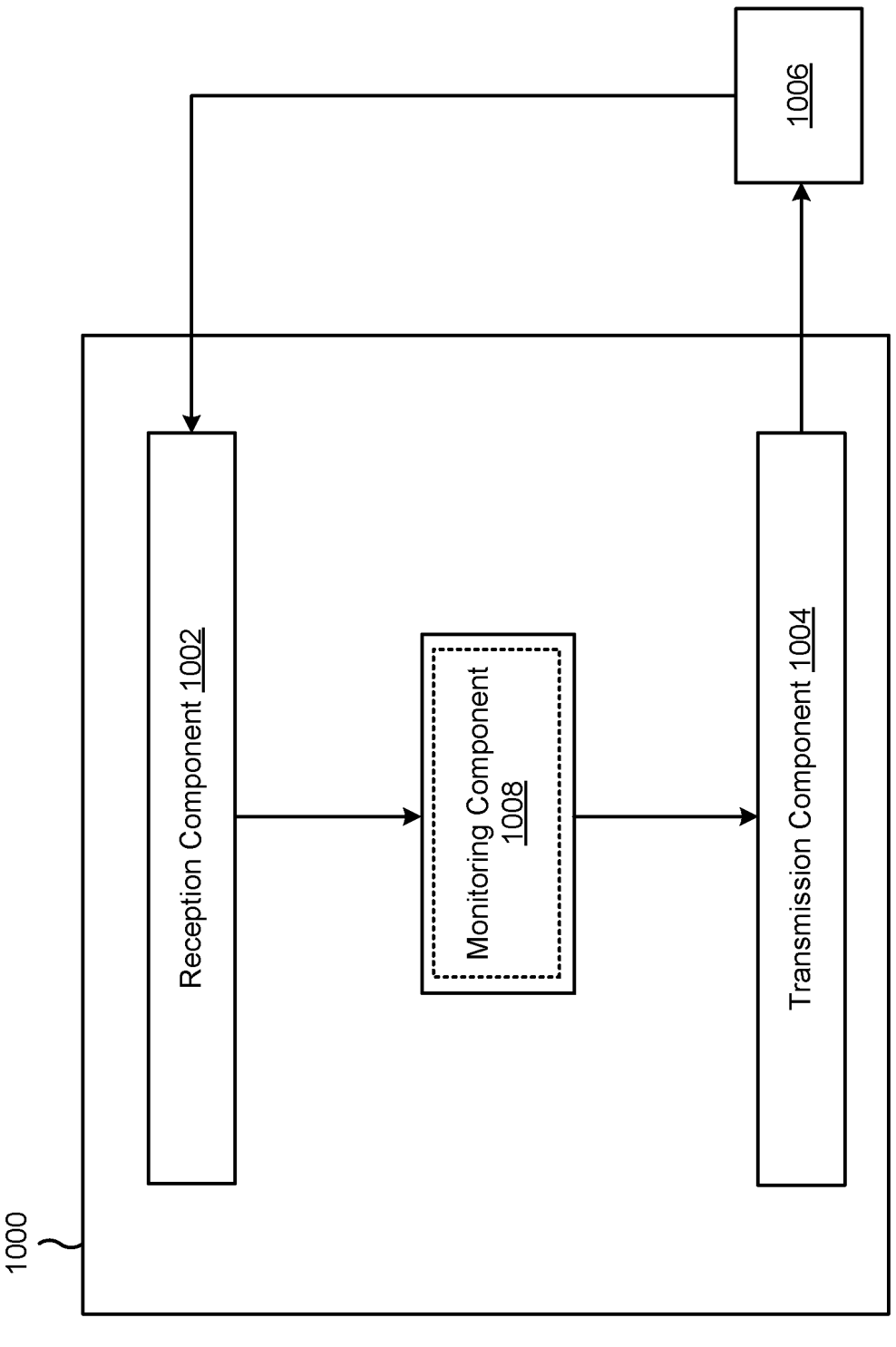
FIG. 10 is a diagram illustrating an example apparatus associated with accommodating PDCCH repetition in the presence of SS set switching, in accordance with the present disclosure.

FIG. 10 is a block diagram of an example apparatus 1000 for wireless communication. The apparatus 1000 may be a UE (e.g., UE 120), or a UE may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a UE, a base station, or another wireless communication device) using the reception component 1002 and the transmission component 1004. As further shown, the apparatus 1000 may include one or more of a monitoring component 1008, among other examples. The monitoring component may include, for example, a controller/processor 240, controller/processor 280, and/or the like to selective monitor PDCCH repetitions.

In some aspects, the apparatus 1000 may be configured to perform one or more operations described herein in connection with FIGS. 3-8. Additionally, or alternatively, the apparatus 1000 may be configured to perform one or more processes described herein, such as process 900 of FIG. 9. In some aspects, the apparatus 1000 and/or one or more components shown in FIG. 10 may include one or more components of the UE described above in connection with FIG. 2. Additionally, or alternatively, one or more components shown in FIG. 10 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1006. In some aspects, the reception component 1002 may include one or more antennas, a demodulator, a MIMO detector, a receive processor, a controller/processor, a memory, or a combination thereof, of the UE described above in connection with FIG. 2.

The transmission component 1004 may transmit communications, such as reference signals, control information, data communications, or a combination thereof, to the apparatus 1006. In some aspects, one or more other components of the apparatus 1006 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modulator, a transmit MIMO processor, a transmit processor, a controller/processor, a memory, or a combination thereof, of the user equipment (UE) described above in connection with FIG. 2. In some aspects, the transmission component 1004 may be co-located with the reception component 1002 in a transceiver.

The reception component 1002 may receive, from a base station, SS configuration information associated with switching between a first SS set group and a second SS set group. The reception component 1002 may receive, from the base station, DCI associated with PDCCH repetitions based at least in part on switching between the first SS set group and the second SS set group.

The monitoring component 1008 may selectively monitor the PDCCH repetitions based at least in part on switching between the first SS set group and the second SS set group.

The monitoring component 1008 may selectively monitor the first PDCCH repetition or the second PDCCH repetition to receive the DCI.

The monitoring component 1008 may selectively monitor the first PDCCH repetition and the second PDCCH repetition based at least in part on the first SS set being linked to the second SS set.

The monitoring component 1008 may selectively monitor the first PDCCH repetition and the second PDCCH repetition based at least in part on switching to the second SS set group.

The monitoring component 1008 may selectively monitor the first PDCCH repetition and the second PDCCH repetition based at least in part on switching to the first SS set group.

The monitoring component 1008 may selectively monitor the first PDCCH repetition and the second PDCCH repetition to receive the DCI.

The monitoring component 1008 may selectively monitor the first PDCCH repetition and the second PDCCH repetition based at least in part on switching to the first SS set group.

The monitoring component 1008 may selectively monitor the first PDCCH repetition and the third PDCCH repetition based at least in part on switching to the second SS set group.

The monitoring component 1008 may selectively monitor the first PDCCH repetition and the second PDCCH repetition based at least in part on switching to the first SS set group to receive the DCI.

The reception component 1002 may receive the first PDCCH repetition during a first slot.

The reception component 1002 may receive the second PDCCH repetition during a second slot.

The monitoring component 1008 may selectively monitor the second PDCCH repetition when the switching takes effect after the first PDCCH repetition is received and before the second PDCCH repetition is received.

The reception component 1002 may receive the first PDCCH repetition during a first slot.

The reception component 1002 may receive the second PDCCH repetition during a second slot.

The monitoring component 1008 may refrain from monitoring the second PDCCH repetition when the switching takes effect after the first PDCCH repetition is received and before the second PDCCH repetition is received.

The reception component 1002 may receive the first PDCCH repetition during a first slot.

The reception component 1002 may receive the second PDCCH repetition during a second slot.

The monitoring component 1008 may selectively monitor the second PDCCH repetition to receive the DCI when the switching is delayed, from taking effect after the first PDCCH repetition is received and before the second PDCCH repetition is received, to taking effect after the second PDCCH repetition is received.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

The following provides an overview of some aspects of the present disclosure:

Aspect 1: A method of wireless communication performed by a user equipment (UE), comprising: receiving, from a base station, search space (SS) configuration information associated with switching between a first SS set group and a second SS set group; and receiving, from the base station, downlink control information (DCI) associated with physical downlink control channel (PDCCH) repetitions based at least in part on switching between the first SS set group and the second SS set group.

Aspect 2: The method of aspect 1, further comprising: selectively monitoring the PDCCH repetitions based at least in part on switching between the first SS set group and the second SS set group.

Aspect 3: The method of any of aspects 1-2, further comprising, when the PDCCH repetitions include a first PDCCH repetition, included in a first SS set associated with the first SS set group, linked to a second PDCCH repetition, included in a second SS set associated with the second SS set group: selectively monitoring the first PDCCH repetition or the second PDCCH repetition to receive the DCI.

Aspect 4: The method of any of aspects 1-2, further comprising, when the PDCCH repetitions include a first PDCCH repetition, included in a first SS set associated with the first SS set group, linked to a second PDCCH repetition, included in a second SS set associated with the second SS set group: selectively monitoring the first PDCCH repetition and the second PDCCH repetition based at least in part on the first SS set being linked to the second SS set.

Aspect 5: The method of any of aspects 1-2, further comprising, when the PDCCH repetitions include a first PDCCH repetition, included in a first SS set associated with the first SS set group and with the second SS set group, linked to a second PDCCH repetition, included in a second SS set associated with the second SS set group: selectively monitoring the first PDCCH repetition and the second PDCCH repetition based at least in part on switching to the second SS set group.

Aspect 6: The method of any of aspects 1-2, further comprising, when the PDCCH repetitions include a first PDCCH repetition, included in a first SS set associated with the first SS set group, linked to a second PDCCH repetition, included in a second SS set associated with the first SS set group: selectively monitoring the first PDCCH repetition and the second PDCCH repetition based at least in part on switching to the first SS set group.

Aspect 7: The method of any of aspects 1-2, further comprising, when the PDCCH repetitions include a first PDCCH repetition, included in a first SS set associated with the first SS set group and with the second SS set group, linked to a second PDCCH repetition, included in a second SS set associated with the first SS set group and with the second SS set group: selectively monitoring the first PDCCH repetition and the second PDCCH repetition to receive the DCI.

Aspect 8: The method of any of aspects 1-2, further comprising, when the PDCCH repetitions include a first PDCCH repetition, included in a first SS set associated with the first SS set group and with the second SS set group, linked to a second PDCCH repetition, included in a second SS set associated with the first SS set group, the first PDCCH repetition being linked to a third PDCCH repetition, included in a third SS set associated with the second SS set group: selectively monitoring the first PDCCH repetition and the second PDCCH repetition based at least in part on switching to the first SS set group, and selectively monitoring the first PDCCH repetition and the third PDCCH repetition based at least in part on switching to the second SS set group.

Aspect 9: The method of any of aspects 1-2, further comprising, when the PDCCH repetitions include a first PDCCH repetition, included in a first SS set, linked to a second PDCCH repetition, included in a second SS set, the first SS set and the second SS set being associated as a pair with the first SS set group: selectively monitoring the first PDCCH repetition and the second PDCCH repetition based at least in part on switching to the first SS set group to receive the DCI.

Aspect 10: The method of any of aspects 1-2, further comprising, when the PDCCH repetitions include a first PDCCH repetition, included in a first SS set, linked to a second PDCCH repetition, included in a second SS set: receiving the first PDCCH repetition during a first slot; receiving the second PDCCH repetition during a second slot; and selectively monitoring the second PDCCH repetition when the switching takes effect after the first PDCCH repetition is received and before the second PDCCH repetition is received.

Aspect 11: The method of any of aspects 1-2, further comprising, when the PDCCH repetitions include a first SS set, linked to a second PDCCH repetition, included in a second SS set: receiving the first PDCCH repetition during a first slot; receiving the second PDCCH repetition during a second slot; and refraining from monitoring the second PDCCH repetition when the switching takes effect after the first PDCCH repetition is received and before the second PDCCH repetition is received.

Aspect 12: The method of any of aspects 1-2, further comprising, when the PDCCH repetitions include a first SS set, linked to a second PDCCH repetition, included in a second SS set: receiving the first PDCCH repetition during a first slot; receiving the second PDCCH repetition during a second slot; and selectively monitoring the second PDCCH repetition to receive the DCI when the switching is delayed, from taking effect after the first PDCCH repetition is received and before the second PDCCH repetition is received, to taking effect after the second PDCCH repetition is received.

Aspect 13: The method of any of aspects 1-12, wherein the DCI is first DCI, and wherein the method further comprises receiving, prior to receiving the first DCI, second DCI indicating to switch between the first SS set group and the second SS set group, wherein receiving the first DCI associated with the PDCCH repetitions is based at least in part on the second DCI.

Aspect 13: An apparatus for wireless communication at a device, comprising a processor; memory coupled with the processor; and instructions stored in the memory and executable by the processor to cause the apparatus to perform the method of one or more aspects of aspects 1-12.

Aspect 14: A device for wireless communication, comprising a memory and one or more processors coupled to the memory, the memory and the one or more processors configured to perform the method of one or more aspects of aspects 1-12.

Aspect 15: An apparatus for wireless communication, comprising at least one means for performing the method of one or more aspects of aspects 1-12.

Aspect 16: A non-transitory computer-readable medium storing code for wireless communication, the code comprising instructions executable by a processor to perform the method of one or more aspects of aspects 1-12.

Aspect 17: A non-transitory computer-readable medium storing a set of instructions for wireless communication, the set of instructions comprising one or more instructions that, when executed by one or more processors of a device, cause the device to perform the method of one or more aspects of aspects 1-12.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
one or more memories; and
one or more processors, coupled to the one or more memories, configured to:
receive, from a base station, search space (SS) configuration information associated with switching between monitoring SS sets associated with a first SS set group and monitoring SS sets associated with a second SS set group,
wherein physical downlink control channel (PDCCH) candidates, included in different SS sets, are linked together for PDCCH repetition by having a same control channel element (CCE) index,
wherein the switch between monitoring the SS sets associated with the first SS set group and monitoring the SS sets associated with the second SS set group dynamically enables or disables the PDCCH repetition for the PDCCH candidates included in the different SS sets based at least in part on:
enablement of the PDCCH repetition when the different SS sets are associated with an active SS set group, and
wherein, to switch between monitoring the SS sets associated with the first SS set group and monitoring the SS sets associated with the second SS set group, the one or more processors are further configured to:
stop monitoring the SS sets associated with the first SS set group and start monitoring the SS sets associated with the second SS set group, or
stop monitoring the SS sets associated with the second SS set group and start monitoring the SS sets associated with the first SS set group; and
receive, from the base station, downlink control information (DCI) associated with PDCCH repetitions via a first PDCCH candidate, associated with the first SS set group, and via a second PDCCH candidate, associated with the second SS set group, that is linked to the first PDCCH candidate and that has a same CCE index as the first PDCCH candidate.

2. The UE of claim 1, wherein, to receive the DCI, the one or more processors are further configured to: selectively monitor the PDCCH repetitions based at least in part on switching between monitoring the SS sets associated with the first SS set group and monitoring the SS sets associated with the second SS set group.

3. The UE of claim 1, wherein the one or more processors are further configured to, when the PDCCH repetitions include a first PDCCH repetition, included in a first SS set associated with the first SS set group, linked to a second PDCCH repetition, included in a second SS set associated with the second SS set group:
selectively monitor the first PDCCH repetition or the second PDCCH repetition to receive the DCI.

4. The UE of claim 1, wherein the one or more processors are further configured to, when the PDCCH repetitions include a first PDCCH repetition, included in a first SS set associated with the first SS set group, linked to a second PDCCH repetition, included in a second SS set associated with the second SS set group:
selectively monitor the first PDCCH repetition and the second PDCCH repetition based at least in part on the first PDCCH repetition being linked to the second PDCCH repetition.

5. The UE of claim 1, wherein the one or more processors are further configured to, when the PDCCH repetitions include a first PDCCH repetition, included in a first SS set associated with the first SS set group and with the second SS set group, linked to a second PDCCH repetition, included in a second SS set associated with the second SS set group:
selectively monitor the first PDCCH repetition and the second PDCCH repetition based at least in part on switching to monitoring the SS sets associated with the second SS set group.

6. The UE of claim 1, wherein the one or more processors are further configured to:
monitor a first PDCCH repetition, associated with the first SS set group, and a second PDCCH repetition, associated with the first SS set group, based at least in part on switching to monitoring the SS sets associated with the first SS set group.

7. The UE of claim 1, wherein the one or more processors are further configured to:
monitor a first PDCCH repetition, associated with the first SS set group and the second SS set group, and a second PDCCH repetition, associated with the first SS set group and the second SS set group, to receive the DCI.

8. The UE of claim 1, wherein the one or more processors are further configured to:
monitor a first PDCCH repetition, associated with the first SS set group and the second SS set group, and a second PDCCH repetition, associated with the first SS set group, based at least in part on switching to monitoring the SS sets associated with the first SS set group, or
monitor a first PDCCH repetition, associated with the first SS set group and the second SS set group, and a third PDCCH repetition, associated with the second SS set group, based at least in part on switching to monitoring the SS sets associated with the second SS set group.

9. The UE of claim 1, wherein the one or more processors are further configured to, when the PDCCH repetitions include a first PDCCH repetition, included in a first SS set, linked to a second PDCCH repetition, included in a second SS set, the first SS set and the second SS set being associated as a pair with the first SS set group:
selectively monitor the first PDCCH repetition and the second PDCCH repetition based at least in part on switching to monitoring the SS sets associated with the first SS set group to receive the DCI.

10. The UE of claim 1, wherein the one or more processors are further configured to, when the PDCCH repetitions include a first PDCCH repetition, included in a first SS set, linked to a second PDCCH repetition, included in a second SS set:

receive the first PDCCH repetition during a first slot;

receive the second PDCCH repetition during a second slot; and selectively monitor the second PDCCH repetition when the switching takes effect after the first PDCCH repetition is received and before the second PDCCH repetition is received.

11. The UE of claim 1, wherein the one or more processors are further configured to, when the PDCCH repetitions include a first PDCCH repetition, included in a first SS set, linked to a second PDCCH repetition, included in a second SS set:

receive the first PDCCH repetition during a first slot;

receive the second PDCCH repetition during a second slot; and refrain from monitoring the second PDCCH repetition when the switching takes effect after the first PDCCH repetition is received and before the second PDCCH repetition is received.

12. The UE of claim 1, wherein the one or more processors are further configured to, when the PDCCH repetitions include a first PDCCH repetition, included in a first SS set, linked to a second PDCCH repetition, included in a second SS set:

receive the first PDCCH repetition during a first slot;

receive the second PDCCH repetition during a second slot; and selectively monitor the second PDCCH repetition to receive the DCI when the switching is delayed, from taking effect after the first PDCCH repetition is received and before the second PDCCH repetition is received, to taking effect after the second PDCCH repetition is received.

13. The UE of claim 1, wherein the DCI is first DCI, and wherein the one or more processors are configured to:

receive, prior to receiving the first DCI, second DCI indicating to switch between monitoring the SS sets associated with the first SS set group and monitoring the SS sets associated with the second SS set group, wherein receiving the first DCI associated with the PDCCH repetitions is based at least in part on the second DCI.

14. The UE of claim 1, wherein the one or more processors are further configured to:

delay monitoring of the first PDCCH candidate by a period of time after the switch or a period of time after an indication to switch.

15. A method of wireless communication performed by a user equipment (UE), comprising:

receiving, from a base station, search space (SS) configuration information associated with switching between monitoring SS sets associated with a first SS set group and monitoring SS sets associated with a second SS set group, wherein physical downlink control channel (PDCCH) candidates, included in different SS sets, are linked together for PDCCH repetition by having a same control channel element (CCE) index, wherein the switching between monitoring the SS sets associated with the first SS set group and monitoring the SS sets associated with the second SS set group dynamically enables or disables the PDCCH repetition for the PDCCH candidates included in the different SS sets based at least in part on:

enablement of the PDCCH repetition when the different SS sets are associated with an active SS set group, and wherein the switching between monitoring the SS sets associated with the first SS set group and monitoring the SS sets associated with the second SS set group includes:

stopping monitoring the SS sets associated with the first SS set group and starting monitoring the SS sets associated with the second SS set group, or stopping monitoring the SS sets associated with the second SS set group and starting monitoring the SS sets associated with the first SS set group; and receiving, from the base station, downlink control information (DCI) associated with PDCCH repetitions via a first PDCCH candidate, associated with the first SS set group, and via a second PDCCH candidate, associated with the second SS set group, that is linked to the first PDCCH candidate and that has a same CCE index as the first PDCCH candidate.

16. The method of claim 15, further comprising: selectively monitoring the PDCCH repetitions based at least in part on switching between monitoring the SS sets associated with the first SS set group and monitoring the SS sets associated with the second SS set group.

17. The method of claim 15, further comprising, when the PDCCH repetitions include a first PDCCH repetition, included in a first SS set associated with the first SS set group, linked to a second PDCCH repetition, included in a second SS set associated with the second SS set group: selectively monitoring the first PDCCH repetition or the second PDCCH repetition to receive the DCI.

18. The method of claim 15, further comprising, when the PDCCH repetitions include a first PDCCH repetition, included in a first SS set associated with the first SS set group, linked to a second PDCCH repetition, included in a second SS set associated with the second SS set group: selectively monitoring the first PDCCH repetition and the second PDCCH repetition based at least in part on the first PDCCH repetition being linked to the second PDCCH repetition.

19. The method of claim 15, further comprising, when the PDCCH repetitions include a first PDCCH repetition, included in a first SS set associated with the first SS set group and with the second SS set group, linked to a second PDCCH repetition, included in a second SS set associated with the second SS set group: selectively monitoring the first PDCCH repetition and the second PDCCH repetition based at least in part on switching to monitoring the SS sets associated with the second SS set group.

20. The method of claim 15, further comprising: monitoring a first PDCCH repetition, associated with the first SS set group, and a second PDCCH repetition, associated with the first SS set group, based at least in part on switching to monitoring the SS sets associated with the first SS set group.

21. The method of claim 15, further comprising: monitoring a first PDCCH repetition, associated with the first SS set group and the second SS set group, and a second PDCCH repetition, associated with the first SS set group and the second SS set group, to receive the DCI.

22. The method of claim 15, further comprising: monitoring a first PDCCH repetition, associated with the first SS set group and the second SS set group, and a second PDCCH repetition, associated with the first SS set group, based at least in part on switching to monitoring the SS sets associated with the first SS set group, or monitoring a first PDCCH repetition, associated with the first SS set group and the second SS set group, and a third PDCCH repetition, associated with the second SS set group, based at least in part on switching to monitoring the SS sets associated with the second SS set group.

23. The method of claim 15, further comprising, when the PDCCH repetitions include a first PDCCH repetition, included in a first SS set, linked to a second PDCCH repetition, included in a second SS set, the first SS set and the second SS set being associated as a pair with the first SS set group: selectively monitoring the first PDCCH repetition and the second PDCCH repetition based at least in part on switching to monitoring the SS sets associated with the first SS set group to receive the DCI.

24. The method of claim 15, further comprising, when the PDCCH repetitions include a first PDCCH repetition, included in a first SS set, linked to a second PDCCH repetition, included in a second SS set: receiving the first PDCCH repetition during a first slot;

receiving the second PDCCH repetition during a second slot; and selectively monitoring the second PDCCH repetition when the switching takes effect after the first PDCCH repetition is received and before the second PDCCH repetition is received.

25. The method of claim 15, further comprising, when the PDCCH repetitions include a first PDCCH repetition, included in a first SS set, linked to a second PDCCH repetition, included in a second SS set: receiving the first PDCCH repetition during a first slot;

receiving the second PDCCH repetition during a second slot; and refraining from monitoring the second PDCCH repetition when the switching takes effect after the first PDCCH repetition is received and before the second PDCCH repetition is received.

26. The method of claim 15, further comprising, when the PDCCH repetitions include a first PDCCH repetition, included in a first SS set, linked to a second PDCCH repetition, included in a second SS set: receiving the first PDCCH repetition during a first slot;

receiving the second PDCCH repetition during a second slot; and selectively monitoring the second PDCCH repetition to receive the DCI when the switching is delayed, from taking effect after the first PDCCH repetition is received and before the second PDCCH repetition is received, to taking effect after the second PDCCH repetition is received.

27. The method of claim 15, wherein the DCI is first DCI, and wherein the method further comprises:

receiving, prior to receiving the first DCI, second DCI indicating to switch between monitoring the SS sets associated with the first SS set group and monitoring the SS sets associated with the second SS set group, wherein receiving the first DCI associated with the PDCCH repetitions is based at least in part on the second DCI.

28. A non-transitory computer-readable medium storing a set of instructions for wireless communication, the set of instructions comprising:

one or more instructions that, when executed by one or more processors of a user equipment (UE), cause the one or more processors to:

receive, from a base station, search space (SS) configuration information associated with switching between monitoring SS sets associated with a first SS set group and monitoring SS sets associated with a second SS set group, wherein physical downlink control channel (PDCCH) candidates, included in different SS sets, are linked together for PDCCH repetition by having a same control channel element (CCE) index, wherein the switch between monitoring the SS sets associated with the first SS set group and monitoring the SS sets associated with the second SS set group dynamically enables or disables the PDCCH repetition for the PDCCH candidates included in the different SS sets based at least in part on:

enablement of the PDCCH repetition when the different SS sets are associated with an active SS set group, and wherein, to switch between monitoring the SS sets associated with the first SS set group and monitoring the SS sets associated with the second SS set group, the one or more instructions further cause the one or more processors to:

stop monitoring the SS sets associated with the first SS set group and start monitoring the SS sets associated with the second SS set group, or stop monitoring the SS sets associated with the second SS set group and start monitoring the SS sets associated with the first SS set group; and receive, from the base station, downlink control information (DCI) associated with PDCCH repetitions via a first PDCCH candidate, associated with the first SS set group, and via a second PDCCH candidate, associated with the second SS set group, that is linked to the first PDCCH candidate and that has a same CCE index as the first PDCCH candidate.

29. The non-transitory computer-readable medium of claim 28, wherein the one or more instructions, that cause the one or more processors to receive the DCI, further cause the one or more processors to:

selectively monitor the PDCCH repetitions based at least in part on switching between monitoring the SS sets associated with the first SS set group and monitoring the SS sets associated with the second SS set group.

30. An apparatus for wireless communication, comprising:

means for receiving, from a base station, search space (SS) configuration information associated with switching between monitoring SS sets associated with a first SS set group and monitoring SS sets associated with a second SS set group, wherein physical downlink control channel (PDCCH) candidates, included in different SS sets, are linked together for PDCCH repetition by having a same control channel element (CCE) index, wherein the switching between monitoring the SS sets associated with the first SS set group and monitoring the SS sets associated with the second SS set group dynamically enables or disables the PDCCH repetition for the PDCCH candidates included in the different SS sets based at least in part on:

enablement of the PDCCH repetition when the different SS sets are associated with an active SS set group, and wherein the switching between monitoring the SS sets associated with the first SS set group and monitoring the SS sets associated with the second SS set group includes:

stopping monitoring the SS sets associated with the first SS set group and starting monitoring the SS sets associated with the second SS set group, or stopping monitoring the SS sets associated with the second SS set group and starting monitoring the SS sets associated with the first SS set group; and means for receiving, from the base station, downlink control information (DCI) associated with PDCCH repetitions via a first PDCCH candidate, associated with the first SS set group, and via a second PDCCH candidate, associated with the second SS set group, that is linked to the first PDCCH candidate and that has a same CCE index as the first PDCCH candidate.

* * * * *